United States Patent
Yu et al.

(10) Patent No.: US 12,418,248 B2
(45) Date of Patent: Sep. 16, 2025

(54) PHOTOVOLTAIC SYSTEM, INVERTER, AND CONTROL METHOD

(71) Applicant: Huawei Digital Power Technologies Co., Ltd., Shenzhen (CN)

(72) Inventors: Xinyu Yu, Shanghai (CN); Xudong Wang, Shanghai (CN); Kai Xin, Shanghai (CN); Lei Shi, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 203 days.

(21) Appl. No.: 18/463,399

(22) Filed: Sep. 8, 2023

(65) Prior Publication Data
US 2023/0421074 A1 Dec. 28, 2023

Related U.S. Application Data

(63) Continuation of application No. PCT/CN2021/079984, filed on Mar. 10, 2021.

(51) Int. Cl.
*H02M 1/12* (2006.01)
*H02M 7/487* (2007.01)

(52) U.S. Cl.
CPC ............ *H02M 7/487* (2013.01); *H02M 1/12* (2013.01)

(58) Field of Classification Search
CPC ... H02M 1/4258; H02M 1/0019; H02M 3/157
See application file for complete search history.

(56) References Cited

U.S. PATENT DOCUMENTS

| | | | | |
|---|---|---|---|---|
| 8,942,019 B2 * | 1/2015 | Shekhawat | ........... | H02M 7/487 363/131 |
| 10,511,235 B1 * | 12/2019 | Lin | ...... | H02M 7/5395 |
| 2023/0308009 A1 * | 9/2023 | Yu | .......... | H02M 1/32 |

FOREIGN PATENT DOCUMENTS

| CN | 100468938 C | 3/2009 |
|---|---|---|
| CN | 101783611 A | 7/2010 |

(Continued)

OTHER PUBLICATIONS

Wang et al., "Novel High-Efficiency Three-Level Stacked-Neutral-Point-Clamped Grid-Tied Inverter", IEEE Transactions on Industrial Electronics, Sep. 2013, vol. 60, No. 9, 9 pages.

*Primary Examiner* — Adolf D Berhane
(74) *Attorney, Agent, or Firm* — Maier & Maier, PLLC

(57) ABSTRACT

A three-level neutral point clamped inverter includes four switch units. When an average value of an output current of the three-level neutral point clamped inverter is greater than a first current threshold or less than a second current threshold, only one of the four switch units is controlled to perform a high-frequency operation, to reduce power consumption caused by a high-frequency operation. The average value of the output current is an average value of the output current of the three-level neutral point clamped inverter in a switching cycle. The first current threshold is a positive number, and the second current threshold is a negative number. Power consumption caused by the high-frequency operation of the switch unit in the inverter may be reduced, and electric energy conversion efficiency of the inverter may be improved. A time period in which two switch units perform complementary operations at high frequency is very small.

20 Claims, 13 Drawing Sheets

(56) References Cited

FOREIGN PATENT DOCUMENTS

| | | |
|---|---|---|
| CN | 104467498 A | 3/2015 |
| CN | 104270027 B | 6/2017 |
| KR | 101688649 B1 | 12/2016 |

\* cited by examiner

Obtain an average value of an output current of a three-level neutral point clamped inverter, where the average value of the output current may be an average value of the output current of the three-level neutral point clamped inverter in a switching cycle — S1401

When the average value of the output current of the three-level neutral point clamped inverter is greater than a first current threshold or less than a second current threshold, control only one of four switching transistors to perform a high-frequency action, to reduce power consumption caused by a high-frequency action, where the first current threshold is a positive number, and the second current threshold is a negative number — S1402

FIG. 14

PHOTOVOLTAIC SYSTEM, INVERTER, AND CONTROL METHOD

CROSS-REFERENCE TO RELATED APPLICATIONS

This application is a continuation of International Application No. PCT/CN2021/079984, filed on Mar. 10, 2021, the disclosure of which is hereby incorporated by reference in its entirety.

TECHNICAL FIELD

The embodiments relate to the field of power electronics technologies, a photovoltaic system, an inverter, and a control method.

BACKGROUND

At present, requirements for inverters continuously increase in fields including photovoltaic power generation, electric vehicles, electric drive, or the like. For example, the inverter needs to have relatively high conversion efficiency and a relatively small volume. Therefore, currently, most inverters use multilevel control. This helps improve a voltage level and power density of the inverter and improve quality of an alternating current output by the inverter.

Currently, a common multilevel inverter is a three-level inverter, and in particular, a three-level diode neutral point clamped (NPC) inverter.

However, at present, a control manner for the three-level NPC inverter causes relatively low electric energy conversion efficiency and relatively poor harmonic quality.

SUMMARY

The embodiments may provide a photovoltaic system, an inverter, and a control method, to improve electric energy conversion efficiency of the inverter, and improve harmonic quality.

An embodiment may provide a photovoltaic system. An inverter included in the photovoltaic system is a three-level NPC inverter. To reduce a switching loss caused by a high-frequency operation of a switch unit in the inverter, this embodiment may provide a new control manner to reduce a time period of the high-frequency operation of the switch unit as much as possible. In this way, the switching loss caused by the high-frequency operation is reduced, and electric energy conversion efficiency is improved. The three-level NPC inverter includes at least four switch units. When an average value of an output current of the three-level neutral point clamped inverter is greater than a first current threshold or less than a second current threshold, a controller controls only one of the four switch units to perform a high-frequency operation. In comparison with a conventional operation manner, a high-frequency operation of one switching transistor is not needed. Therefore, power consumption caused by the high-frequency operation may be reduced. To more accurately control the operation of the switch unit, the average value of the output current is an average value of the output current of the three-level NPC inverter in a switching cycle, and the switching cycle is a switching cycle of the switching transistor in the switch unit. The output current of the inverter is positive when flowing out of the inverter and is negative when flowing into the inverter. The first current threshold is a positive number, and the second current threshold is a negative number.

According to the embodiment, when the average value of the output current of the three-level NPC inverter is in a preset interval near 0, it indicates that the output current is relatively small, and is likely to be sometimes positive and sometimes negative. Therefore, two switching transistors need to be controlled to perform high-frequency operations, to provide a current path when the output current fluctuates. However, when the average value of the output current is outside the preset interval, it indicates that an absolute value of the output current is relatively large and is not near 0, and the output current is not sometimes positive and sometimes negative. Therefore, only one of the switching transistors is controlled to perform a high-frequency operation. In this way, the high-frequency operation of the switching transistor may be greatly reduced, the loss caused by the high-frequency operation of the switching transistor is reduced, and the electric energy conversion efficiency of the inverter is improved. In addition, according to the embodiment, only one switching transistor performs a high-frequency operation in most time periods, and a time period in which two switching transistors perform complementary operations at high frequency is very small Therefore, setting of a dead time may be reduced or no dead time is set outside the preset interval. In this way, a total harmonic current distortion of the output current of the inverter may be improved.

An absolute value of the first current threshold may be equal to or not equal to an absolute value of the second current threshold. When the absolute value of the first current threshold is not equal to the absolute value of the second current threshold, the absolute value of the first current threshold may be greater than the absolute value of the second current threshold, or the absolute value of the first current threshold may be less than the absolute value of the second current threshold.

When the absolute value of the first current threshold is equal to the absolute value of the second current threshold, the second current threshold and the first current threshold are symmetric about a point 0, in other words, the preset interval is a symmetric interval about the point 0.

The foregoing describes the time period of the high-frequency operation of one of the four switch units. The following describes a time period of high-frequency operations of two switch units. The controller is further configured to: when the average value of the output current is greater than the second current threshold and less than the first current threshold, control two of the four switch units to perform high-frequency operations. In other words, the two switch units are controlled to perform high-frequency operations only when needed, to provide a path for a current that changes between positive and negative values.

A control manner may be performing classification control based on a positive half cycle and a negative half cycle of an output voltage. In the positive half cycle of the output voltage of the three-level neutral point clamped inverter, the controller is further configured to: control a second switch unit to be turned on, and control a fourth switch unit to be turned off; if the average value of the output current is greater than the first current threshold, control a third switch unit to be turned off, and control a first switch unit to perform a high-frequency operation; and if the average value of the output current is less than the second current threshold, control the first switch unit to be turned off, and control the third switch unit to perform a high-frequency operation.

In the negative half cycle of the output voltage, the controller is further configured to: control the third switch unit to be turned on, and control the first switch unit to be turned off; if the average value of the output current is greater than the first current threshold, control the fourth switch unit to be turned off, and control the second switch unit to perform a high-frequency operation; and if the average value of the output current is less than the second current threshold, control the second switch unit to be turned off, and control the fourth switch unit to perform a high-frequency operation.

The following describes a principle of setting the first current threshold and the second current threshold. In a possible implementation, in one power frequency cycle, that is, a power frequency cycle corresponding to the output voltage of the inverter, based on a conventional control manner, two switching transistors perform complementary operations at high frequency in each half cycle of the output voltage. That is, T1 and T3 perform complementary operations at high frequency, and T2 and T4 perform complementary operations at high frequency. A minimum value, a maximum value, and an average value of the output current of the inverter in one switching cycle are obtained. When the minimum value of the output current in one switching cycle is 0, it indicates that the output current in the switching cycle is in a positive half cycle. In this case, the average value of the output current in the switching cycle is greater than 0 and is denoted as a first average current. In this case, the first current threshold is greater than or equal to the average value of the output current corresponding to the switching cycle, in other words, the average value of the output current is a lower limit value of the first current threshold. When the maximum value of the output current in one switching cycle is 0, it indicates that the output current in the switching cycle is in a negative half cycle. In this case, the average value of the output current in the switching cycle is less than 0 and is denoted as a second average current. In this case, the second current threshold is less than or equal to the average value of the output current corresponding to the switching cycle, in other words, the average value of the output current is an upper limit value of the second current threshold.

The first current threshold and the second current threshold described above may be fixed or may be adjusted based on some parameters. The following describes several adjustment manners. To more accurately control an operation of each switching transistor in the inverter, the first current threshold or the second current threshold or both may be adjusted based on an actual working condition. In other words, only the first current threshold may be adjusted, or only the second current threshold may be adjusted, or both the first current threshold and the second current threshold may be adjusted. Parameters that may be affected by an actual working condition include: a total harmonic current distortion of the output current, a modulation ratio of the three-level neutral point clamped inverter, a power factor of the inverter, or an output power of the three-level neutral point clamped inverter.

In a possible implementation, the controller obtains the total harmonic current distortion of the output current. If the total harmonic current distortion increases, the first current threshold is increased. If the total harmonic current distortion decreases, the first current threshold is decreased.

In a possible implementation, the controller obtains the modulation ratio of the three-level neutral point clamped inverter. If the modulation ratio decreases, the first current threshold is increased. If the modulation ratio increases, the first current threshold is decreased. The modulation ratio is a ratio of an output phase voltage peak of the three-level neutral point clamped inverter to a half direct current bus voltage.

In a possible implementation, the controller obtains the power factor of the three-level neutral point clamped inverter. If an absolute value of the power factor decreases, the first current threshold is increased. If the absolute value of the power factor increases, the first current threshold is decreased.

In a possible implementation, the controller obtains the output power of the three-level neutral point clamped inverter. If the output power decreases, the first current threshold is increased. If the output power increases, the first current threshold is decreased.

In a possible implementation, the controller obtains the total harmonic current distortion of the output current. If the total harmonic current distortion increases, the second current threshold is decreased. If the total harmonic current distortion decreases, the second current threshold is increased.

In a possible implementation, the controller obtains the modulation ratio of the three-level neutral point clamped inverter. If the modulation ratio decreases, the second current threshold is decreased. If the modulation ratio increases, the second current threshold is increased. The modulation ratio is the ratio of the output phase voltage peak of the three-level neutral point clamped inverter to the half direct current bus voltage.

In a possible implementation, the controller obtains the power factor of the three-level neutral point clamped inverter. If the absolute value of the power factor decreases, the second current threshold is decreased. If the absolute value of the power factor increases, the second current threshold is increased.

In a possible implementation, the controller obtains the output power of the three-level neutral point clamped inverter. If the output power decreases, the second current threshold is decreased. If the output power increases, the second current threshold is increased.

A type of the photovoltaic system is not limited in this embodiment. In other words, the three-level NPC inverter may be a central inverter, a string inverter, or a household single-phase inverter.

In a possible implementation, the three-level neutral point clamped inverter further includes: a first capacitor, a second capacitor, a first diode, and a second diode. A first end of the first capacitor is connected to a positive direct current bus, a second end of the first capacitor is connected to a first end of the second capacitor, and a second end of the second capacitor is connected to a negative direct current bus. A cathode of the first diode is connected to a second end of the first switch unit, an anode of the first diode is connected to the second end of the first capacitor, a cathode of the second diode is connected to the anode of the first diode, and an anode of the second diode is connected to a second end of the third switch unit.

The foregoing embodiment describes the photovoltaic system. An embodiment may further provide a three-level NPC inverter, as described in the following. An application scenario of the three-level NPC inverter is not limited in this embodiment and may be any scenario in which the inverter is needed. In addition to a photovoltaic power generation scenario, the application scenario may alternatively be another scenario in which a direct current needs to be converted into an alternating current, such as a data center, a base station, or an electric vehicle. Advantages of the solutions provided in the foregoing embodiment are also applicable to the following inverter, and details are not described herein again.

An embodiment may further provide a three-level neutral point clamped inverter, including at least four switch units and an inverter controller. The inverter controller is configured to: when an average value of an output current of the three-level neutral point clamped inverter is greater than a first current threshold or less than a second current threshold, control only one of the four switch units to perform a high-frequency operation, to reduce power consumption caused by a high-frequency operation. The average value of the output current is an average value of the output current of the three-level neutral point clamped inverter in a switching cycle. The output current of the inverter is positive when flowing out of the inverter and is negative when flowing into the inverter. The first current threshold is a positive number, and the second current threshold is a negative number.

In a possible implementation, in a positive half cycle of an output voltage of the three-level neutral point clamped inverter, the inverter controller is further configured to: control a second switch unit to be turned on, and control a fourth switch unit to be turned off; if the average value of the output current is greater than the first current threshold, control a third switch unit to be turned off, and control a first switch unit to perform a high-frequency operation; and if the average value of the output current is less than the second current threshold, control the first switch unit to be turned off, and control the third switch unit to perform a high-frequency operation.

In a negative half cycle of the output voltage, the inverter controller is further configured to: control the third switch unit to be turned on, and control the first switch unit to be turned off; if the average value of the output current is greater than the first current threshold, control the fourth switch unit to be turned off, and control the second switch unit to perform a high-frequency operation; and if the average value of the output current is less than the second current threshold, control the second switch unit to be turned off, and control the fourth switch unit to perform a high-frequency operation.

In a possible implementation, the inverter controller adjusts the first current threshold based on any one of the following parameters: a total harmonic current distortion of the output current, a modulation ratio of the three-level neutral point clamped inverter, a power factor of the inverter, or an output power of the three-level neutral point clamped inverter.

In a possible implementation, the inverter controller adjusts the second current threshold based on any one of the following parameters: the total harmonic current distortion of the output current, the modulation ratio of the three-level neutral point clamped inverter, the power factor of the inverter, or the output power of the three-level neutral point clamped inverter.

In a possible implementation, the three-level neutral point clamped inverter further includes: a first capacitor, a second capacitor, a first diode, and a second diode. A first end of the first capacitor is connected to a positive direct current bus, a second end of the first capacitor is connected to a first end of the second capacitor, and a second end of the second capacitor is connected to a negative direct current bus. A cathode of the first diode is connected to a second end of the first switch unit, an anode of the first diode is connected to the second end of the first capacitor, a cathode of the second diode is connected to the anode of the first diode, and an anode of the second diode is connected to a second end of the third switch unit.

Based on the three-level NPC inverter provided in the foregoing embodiment, an embodiment may further provide a control method for an inverter, which is applied to a three-level neutral point clamped inverter. Advantages of an implementation are also applicable to the following method, and details are not described herein again.

The three-level neutral point clamped inverter includes at least four switch units. The method includes: obtaining an average value of an output current of the three-level neutral point clamped inverter, where the average value of the output current is an average value of the output current of the three-level neutral point clamped inverter in a switching cycle; and when the average value of the output current of the three-level neutral point clamped inverter is greater than a first current threshold or less than a second current threshold, controlling only one of the four switch units to perform a high-frequency operation, to reduce power consumption caused by a high-frequency operation. The output current of the inverter is positive when flowing out of the inverter and is negative when flowing into the inverter. The first current threshold is a positive number, and the second current threshold is a negative number.

In a possible implementation, in a positive half cycle of an output voltage of the three-level neutral point clamped inverter, the controlling only one of the four switch units to perform a high-frequency operation when the average value of the output current of the three-level neutral point clamped inverter is greater than a first current threshold or less than a second current threshold further includes: controlling a second switch unit to be turned on, and controlling a fourth switch unit to be turned off; if the average value of the output current is greater than the first current threshold, controlling a third switch unit to be turned off, and controlling a first switch unit to perform a high-frequency operation; and if the average value of the output current is less than the second current threshold, controlling the first switch unit to be turned off, and controlling the third switch unit to perform a high-frequency operation. In a negative half cycle of the output voltage, the controlling only one of the four switch units to perform a high-frequency operation when the average value of the output current of the three-level neutral point clamped inverter is greater than a first current threshold or less than a second current threshold further includes: controlling the third switch unit to be turned on, and controlling the first switch unit to be turned off; if the average value of the output current is greater than the first current threshold, controlling the fourth switch unit to be turned off, and controlling the second switch unit to perform a high-frequency operation; and if the average value of the output current is less than the second current threshold, controlling the second switch unit to be turned off, and controlling the fourth switch unit to perform a high-frequency operation.

It can be seen from the embodiment may have the following advantages.

According to the embodiment, the average value of the output current of the inverter in one switching cycle is obtained in real time, the average value of the output current is compared with the preset interval, and the switch unit is controlled, based on a comparison result, to operate. When the average value of the output current is in the preset interval, two of the four switch units are controlled to perform high-frequency operations. When the average value of the output current is outside the preset interval, only one of the four switch units is controlled to perform a high-frequency operation. The preset interval is an interval near 0, that is, a preset interval formed by the second current threshold less than 0 and the first current threshold greater than 0. The solution is different from a conventional solution in which two of the four switch units are controlled to perform complementary operations at high frequency in each half cycle. The embodiment may greatly reduce the time period of the high-frequency operation of the switch unit. Therefore, power consumption caused by the high-frequency operation of the switch unit in the inverter may be reduced, and electric energy conversion efficiency of the inverter may be improved. In addition, according to the embodiment, only one switch unit performs a high-frequency operation in most time periods, and a time period in which two switch units perform complementary operations at high frequency is very small Therefore, setting of a dead time may be reduced or no dead time is set outside the preset interval. In this way, the total harmonic current distortion of the output current of the inverter may be improved, in other words, harmonic quality may be improved.

BRIEF DESCRIPTION OF THE DRAWINGS

FIG. 14 is a flowchart of a control method for a three-level NPC inverter according to an embodiment.

DETAILED DESCRIPTION OF THE EMBODIMENTS

The following terms "first", "second", and the like are only intended for a purpose of description and shall not be understood as an indication or implication of relative importance or implicit indication of a quantity of indicated characteristics. Therefore, a feature limited by "first" or "second" may explicitly or implicitly include one or more features. In the descriptions, unless otherwise stated, "a plurality of" means two or more than two.

In addition, orientation terms such as "up" and "down" may include, but are not limited to, orientations of schematically placed components in relative accompanying drawings. It should be understood that these orientation terms may be relative concepts. The orientation terms are used for relative description and clarification and may vary correspondingly based on a change in an orientation in which the component is placed in the accompanying drawings.

The term "connection" should be understood in a broad sense unless otherwise expressly specified and limited. For example, the "connection" may be a fixed connection, or may be a detachable connection or an integrated connection; and may be a direct connection or may be an indirect connection through an intermediate medium. In addition, a term "coupling" may be a manner of implementing an electrical connection for signal transmission. The "coupling" may be a direct electrical connection or may be an indirect electrical connection through an intermediate medium.

The embodiments may relate to a photovoltaic system, and to a three-level inverter applied to the photovoltaic system. Because a photovoltaic module outputs a direct current, the inverter needs to convert the direct current into an alternating current, and then feeds back the alternating current to a grid or provides the alternating current to an electric device. A structure of the photovoltaic system is not limited in the embodiments. The photovoltaic system may be a photovoltaic system including a central inverter or may be a photovoltaic system including a string inverter or may be a household single-phase photovoltaic system. The foregoing photovoltaic systems each may include a three-level inverter. The following describes topology forms of the foregoing three photovoltaic systems with reference to the accompanying drawings.

Figure 1:
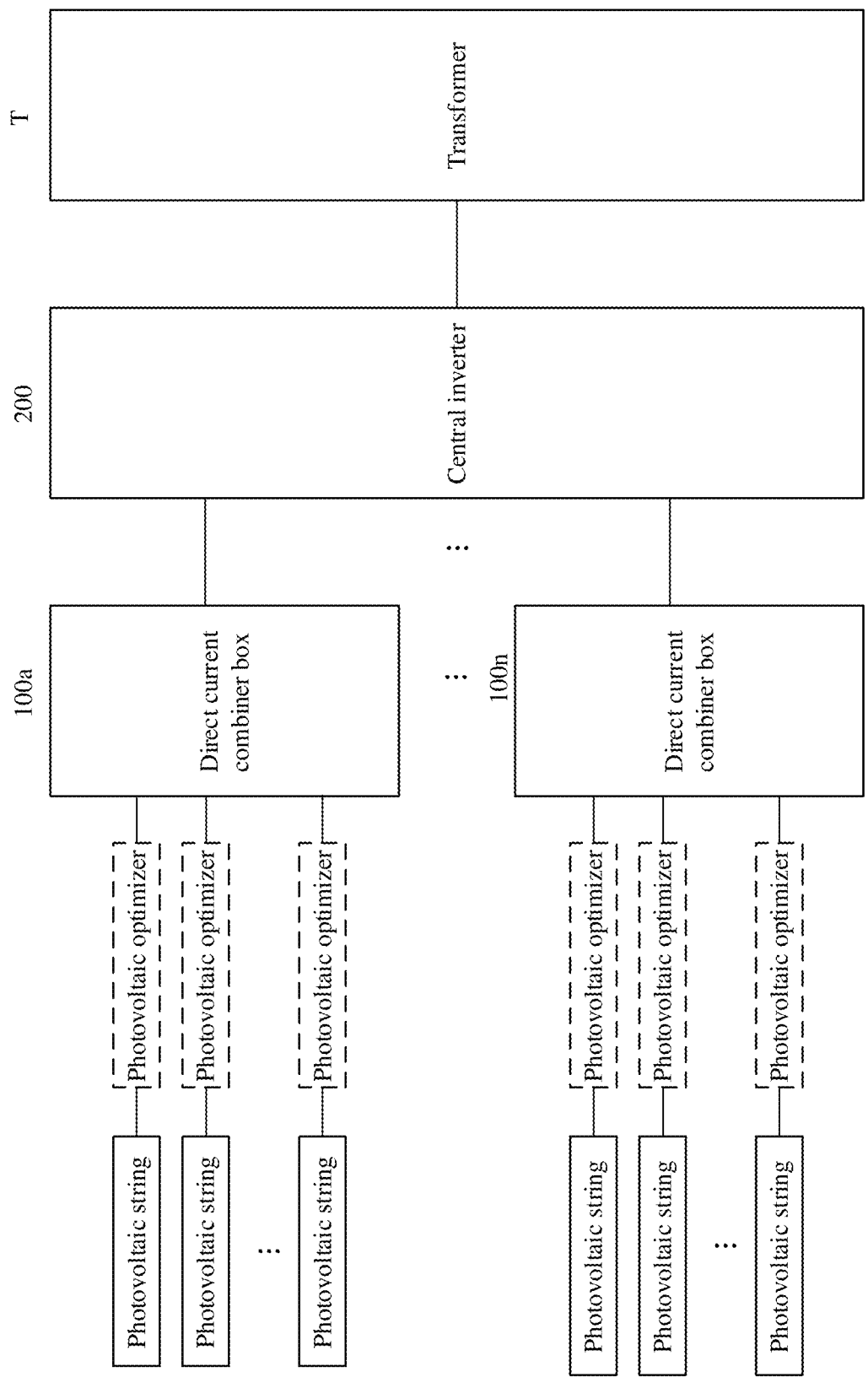
FIG. 1 is a schematic diagram of a photovoltaic system corresponding to a central inverter according to an embodiment.

FIG. 1 is a schematic diagram of a photovoltaic system corresponding to a central inverter according to an embodiment.

When the photovoltaic system includes the central inverter, the central inverter includes only an inverter circuit. That is, power conversion includes only a direct current-alternating current conversion circuit and does not include a direct current-direct current conversion circuit.

As shown in FIG. 1, the photovoltaic system includes a plurality of direct current combiner boxes, for example, includes a direct current combiner box 100a to a direct current combiner box 100n. Output ends of the plurality of direct current combiner boxes are all connected to an input end of a central inverter 200. An output end of the central inverter 200 is connected to a primary winding of a transformer T. A secondary winding of the transformer T may be connected to an alternating current grid.

An input end of each direct current combiner box may be directly connected to a plurality of photovoltaic strings. A quantity of the photovoltaic strings is not limited. In addition, the input end of the direct current combiner box may alternatively be connected to the photovoltaic string through a photovoltaic optimizer. Each photovoltaic string corresponds to one photovoltaic optimizer. Whether the photovoltaic system has a photovoltaic optimizer is not limited in this embodiment.

The central inverter 200 shown in FIG. 1 may be a three-level NPC inverter.

The following describes another photovoltaic system. The photovoltaic system includes a string inverter.

Figure 2:
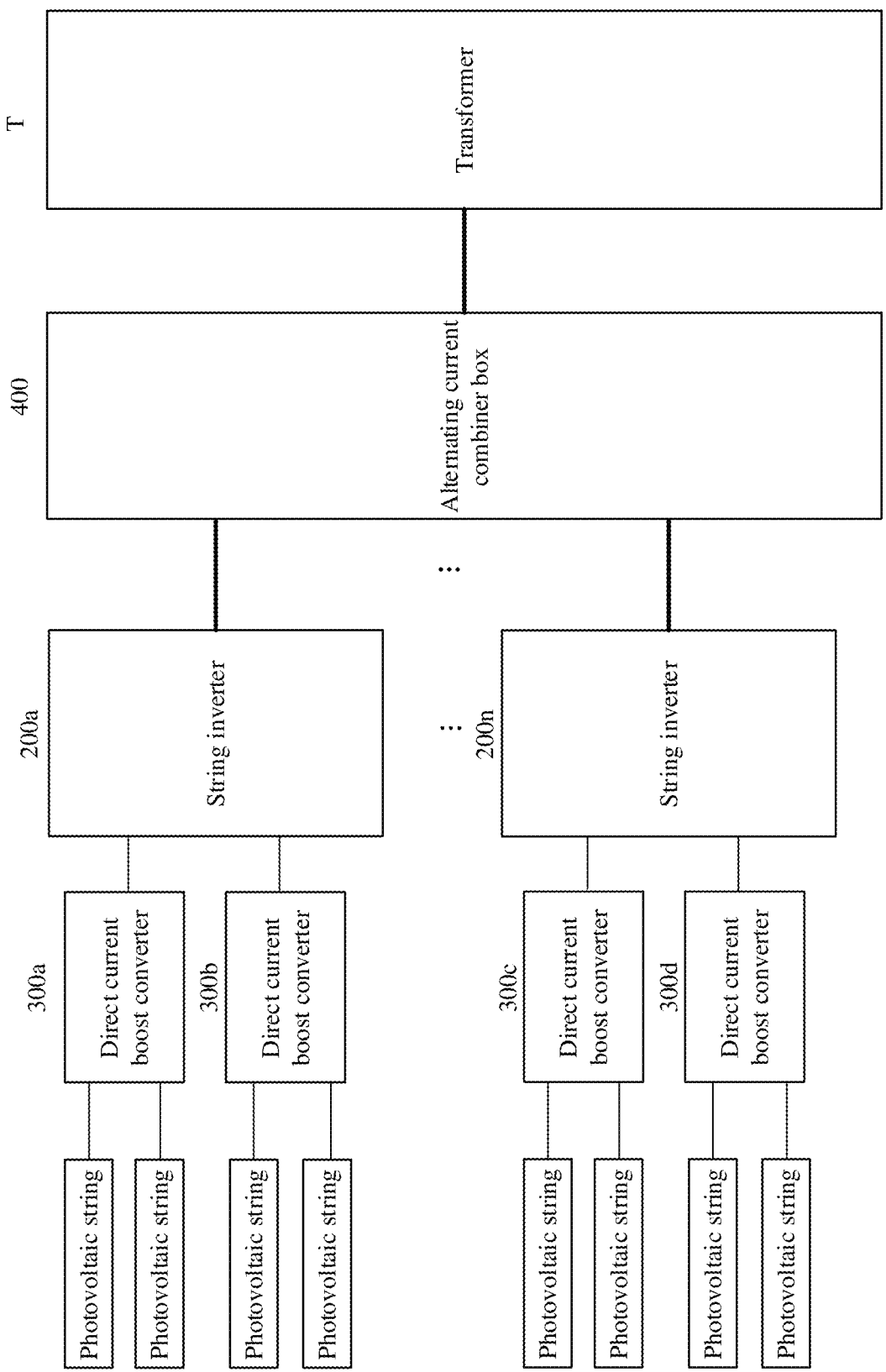
FIG. 2 is a schematic diagram of a photovoltaic system corresponding to a string inverter according to an embodiment.

FIG. 2 is a schematic diagram of a photovoltaic system corresponding to a string inverter according to an embodiment.

The photovoltaic system shown in FIG. 2 may include a plurality of string inverters. As shown in FIG. 2, the plurality of string inverters may be a string inverter 200a to a string inverter 200n. An example in which an input end of each string inverter is connected to two direct current boost converters is used for description. For example, an input end of the string inverter 200a is connected to a direct current boost converter 300a and a direct current boost converter 300b. An input end of the string inverter 200b is connected to a direct current boost converter 300c and a direct current boost converter 300d. A quantity of direct current boost converters connected to the input end of the string inverter is not limited in this embodiment.

An example in which an input end of each direct current boost converter is connected to two photovoltaic strings is used for description. A quantity of photovoltaic strings connected to the input end of the direct current boost converter is not limited in this embodiment.

Output ends of the string inverter 200a to the string inverter 200n are all connected to an input end of an alternating current combiner box 400. An output end of the alternating current combiner box 400 is connected to a primary winding of a transformer T. A secondary winding of the transformer T may be connected to an alternating current grid.

The string inverter in FIG. 2 may be a three-level NPC inverter.

Figure 3:
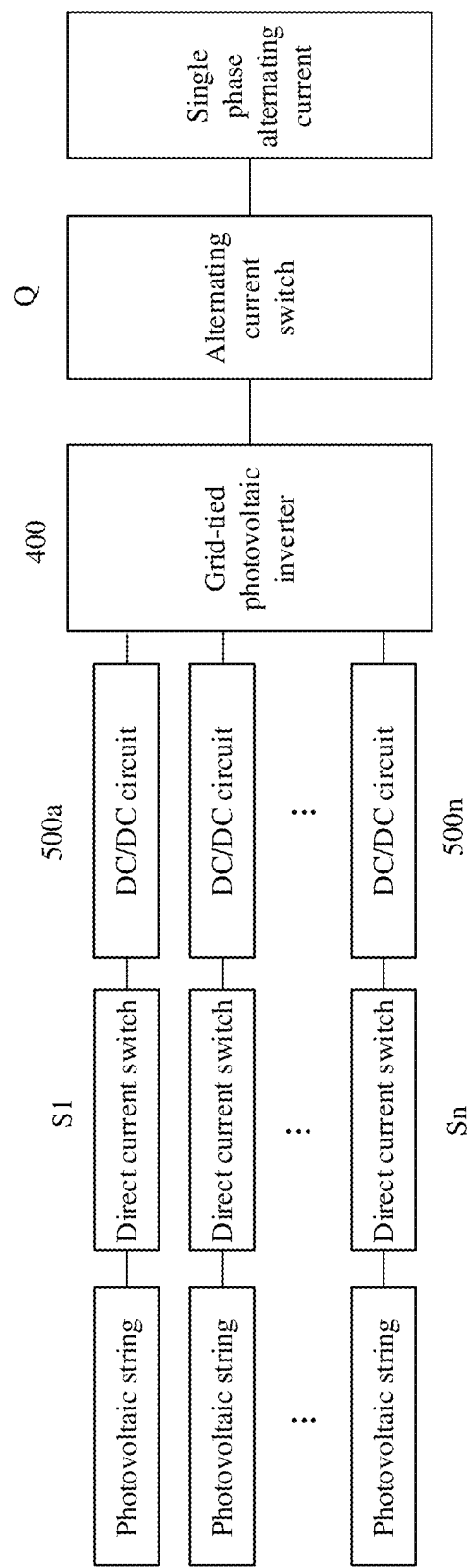
FIG. 3 is a schematic diagram of a household single-phase photovoltaic system according to an embodiment.

The following describes a household photovoltaic system with reference to FIG. 3. Because the household photovoltaic system is directly used for a household electrical device, only single-phase mains power, for example, a 220 V alternating current, needs to be output. If there is a surplus of power, the surplus of power may be fed back to the alternating current grid.

FIG. 3 is a schematic diagram of a household single-phase photovoltaic system according to an embodiment.

A grid-tied photovoltaic inverter 400 in the household photovoltaic system may also be a three-level NPC inverter. An input end of the grid-tied photovoltaic inverter 400 is connected to a plurality of DC/DC circuits, for example, a DC/DC circuit 500a to a DC/DC circuit 500n. The DC/DC circuits are in a one-to-one correspondence with direct current switches. For example, an input end of the DC/DC circuit 500a is connected to a corresponding photovoltaic string through a direct current switch S1, and an input end of the DC/DC circuit 500b is connected to a photovoltaic string through a direct current switch Sn. FIG. 3 only shows that one DC/DC circuit is correspondingly connected to one photovoltaic string. In addition, one DC/DC circuit may further be connected to a plurality of photovoltaic strings.

An output end of the grid-tied photovoltaic inverter 400 is connected to a single phase alternating current through an alternating current switch Q.

The inverters in the three photovoltaic systems described above each may be a three-level NPC inverter. To make persons skilled in the art better understand the embodiments, the following describes a circuit structure of a three-level NPC inverter with reference to the accompanying drawings.

Figure 4:
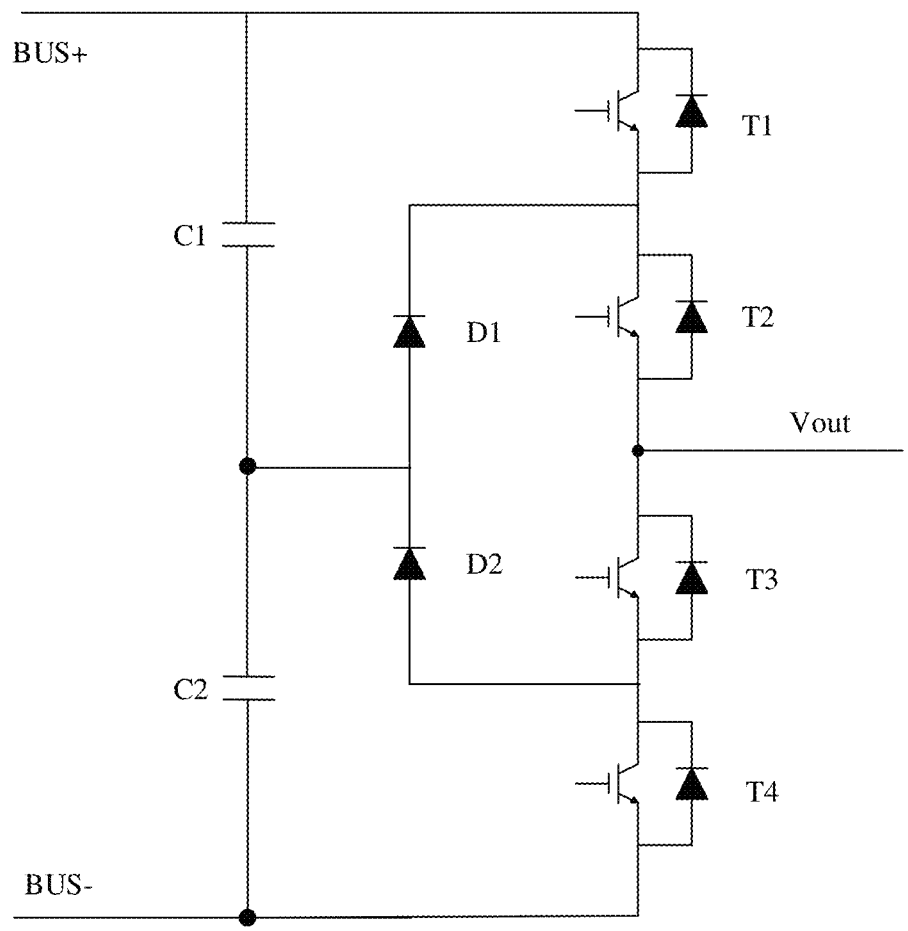
FIG. 4 is a schematic diagram of a three-level NPC inverter according to an embodiment.

FIG. 4 is a schematic diagram of a three-level NPC inverter.

FIG. 4 shows a schematic diagram of a single-phase inverter.

The three-level NPC inverter includes four switching transistors, two diodes, and two capacitors. The four switching transistors are a first switching transistor T1, a second switching transistor T2, a third switching transistor T3, and a fourth switching transistor T4. The two diodes are a first diode D1 and a second diode D2. The two capacitors are a first capacitor C1 and a second capacitor C2. In a photovoltaic system, both the first capacitor C1 and the second capacitor C2 are bus capacitors. That is, after being connected in series, C1 and C2 are connected between a positive direct current bus BUS+ and a negative direct current bus BUS−.

A first end of the first capacitor C1 is connected to a first end of the first switching transistor T1, and both the first end of the first capacitor C1 and the first end of the first switching transistor T1 are connected to a positive direct current electrode. In the photovoltaic system, the positive direct current electrode may be the positive direct current bus BUS+, a second end of the first capacitor C1 is connected to a first end of the second capacitor C2, and a second end of the second capacitor C2 is connected to a negative direct current electrode. In the photovoltaic system, the negative direct current electrode may be the negative direct current bus BUS−.

A second end of the first switching transistor T1 is connected to a first end of the second switching transistor T2. A second end of the second switching transistor T2 is connected to a first end of the third switching transistor T3. A second end of the third switching transistor T3 is connected to a first end of the fourth switching transistor T4. A second end of the fourth switching transistor T4 is connected to the negative direct current electrode and is connected to the negative direct current bus BUS− in the photovoltaic system.

A cathode of the first diode D1 is connected to the second end of the first switching transistor T1, and an anode of the first diode D1 is connected to the second end of the first capacitor C1, such as a common end of C1 and C2. A cathode of the second diode D2 is connected to the anode of the first diode D1, and an anode of the second diode D2 is connected to the second end of the third switching transistor T3.

In this embodiment, an implementation of the four switching transistors T1 to T4 is not limited. For example, the four switching transistors T1 to T4 may be metal-oxide-semiconductor field-effect transistors (MOSFETs) or isolated gate bipolar transistors (IGBTs), and the four switching transistors T1 to T4 each include an anti-parallel diode. The anti-parallel diode is used to provide a current path when the switching transistor is turned off.

An output end of the three-level NPC inverter is the second end of the second switching transistor T2.

Figure 5A:
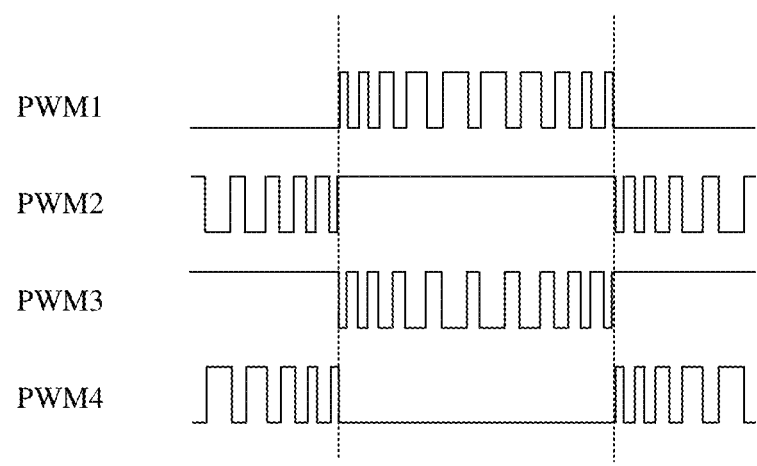
FIG. 5A is a time sequence diagram of a pulse drive signal.

For pulse drive signals corresponding to the four switching transistors of the three-level NPC inverter, refer to FIG. 5A. FIG. 5A is a time sequence diagram of a pulse drive signal.

In FIG. 5A, a pulse drive signal corresponding to PWM 1 is used to drive the first switching transistor T1 to operate, a pulse drive signal corresponding to PWM 2 is used to drive the second switching transistor T2 to operate, a pulse drive signal corresponding to PWM 3 is used to drive the third switching transistor T3 to operate, and a pulse drive signal corresponding to PWM 4 is used to drive the fourth switching transistor T4 to operate. In a high-level time period of the pulse drive signal, the switching transistor may be turned on, and in a low-level time period of the pulse drive signal, the switching transistor may be turned off.

In a positive half cycle of an output voltage of the three-level NPC inverter, the first switching transistor T1 and the third switching transistor T3 perform complementary operations at high frequency, the second switching transistor T2 is turned on, and the fourth switching transistor T4 is turned off. The high frequency means that a switching frequency of the switching transistor is higher than a power frequency. For example, the power frequency is 50 Hz. On the contrary, in a negative half cycle of the output voltage of the three-level NPC inverter, the second switching transistor T2 and the fourth switching transistor T4 perform complementary operations at high frequency, the first switching transistor T1 is turned off, and the third switching transistor T3 is turned on.

A disadvantage of the pulse drive signal in FIG. 5A is analyzed with reference to FIG. 4. In a positive half cycle of an output voltage Vout, T1 performs a high-frequency operation, T2 is turned on, T3 performs a high-frequency operation, T4 is turned off, and a current path is BUS+-T1-T2-Vout. However, in an actual work process, in most time periods of the positive half cycle of the output voltage, a current does not pass through T3. Therefore, the high-frequency operation of T3 causes relatively large power consumption. Similarly, in the negative half cycle of the output voltage Vout, T2 and T4 perform high-frequency operations, T1 is turned off, T3 is turned on, and a current path is BUS--T4-T3-Vout. In an actual work process, in most time periods of the negative half cycle of the output voltage, a current does not pass through T2. Therefore, the high-frequency operation of T2 causes relatively large power consumption. The foregoing power consumption reduces conversion efficiency of the three-level NPC inverter.

For ease of description, the three-level NPC inverter is briefly referred to as an inverter in the following.

Therefore, to resolve a disadvantage of conventional control of a three-level NPC inverter, this embodiment may provide a new control manner, and an effect of the new control manner is particularly outstanding when the three-level NPC inverter is used in a photovoltaic system. In the photovoltaic system, a photovoltaic string outputs a direct current corresponding to direct current power, and the direct current power is transmitted to an alternating current grid, provided that only active power is generated. Therefore, in most time periods and scenarios, a direction of an output voltage and a direction of an output current of the inverter are the same, in other words, the output voltage and the output current of the inverter are in a same direction. In only fewer time periods or scenarios, the direction of the output voltage and the direction of the output current of the inverter are different, in other words, the output voltage and the output current of the inverter are in opposite directions. If a direction in which a current flows out from the second end of the second switching transistor T2 is defined as positive, the output current is negative in fewer time periods. That is, the output current of the inverter is positive when flowing out of the inverter and is negative when flowing into the inverter. Because a current and voltage of the alternating current grid are sine waves, an average value of the output current needs to be a sine wave. However, when the average value of the output current is relatively small, the relatively small average current is superimposed by a ripple current, where the ripple current is generated due to an operation of a switching transistor. Therefore, after the ripple current is superimposed, an output current is sometimes positive and sometimes negative, and fluctuates. Therefore, only when the output current is negative, T3 and T2 need to temporarily provide a current path for energy release.

According to the embodiment, when the average value of the output current of the three-level neutral point clamped inverter is in a preset interval near 0, it indicates that the output current is relatively small, and is likely to be sometimes positive and sometimes negative. Therefore, two switching transistors need to be controlled to perform high-frequency operations, to provide a current path when the output current fluctuates. However, when the average value of the output current is outside the preset interval, it indicates that an absolute value of the output current is relatively large and is not near 0, and the output current is not sometimes positive and sometimes negative. Therefore, only one of the switching transistors is controlled to perform a high-frequency operation. In this way, the high-frequency operation of the switching transistor may be greatly reduced, a loss caused by the high-frequency operation of the switching transistor is reduced, and electric energy conversion efficiency of the inverter is improved. In addition, according to the embodiment, only one switching transistor performs a high-frequency operation in most time periods, and a time period in which two switching transistors perform complementary operations at high frequency is very small Therefore, setting of a dead time may be reduced or no dead time is set outside the preset interval. In this way, a total harmonic current distortion (THDi) of the output current of the inverter may be improved.

Figure 5B:
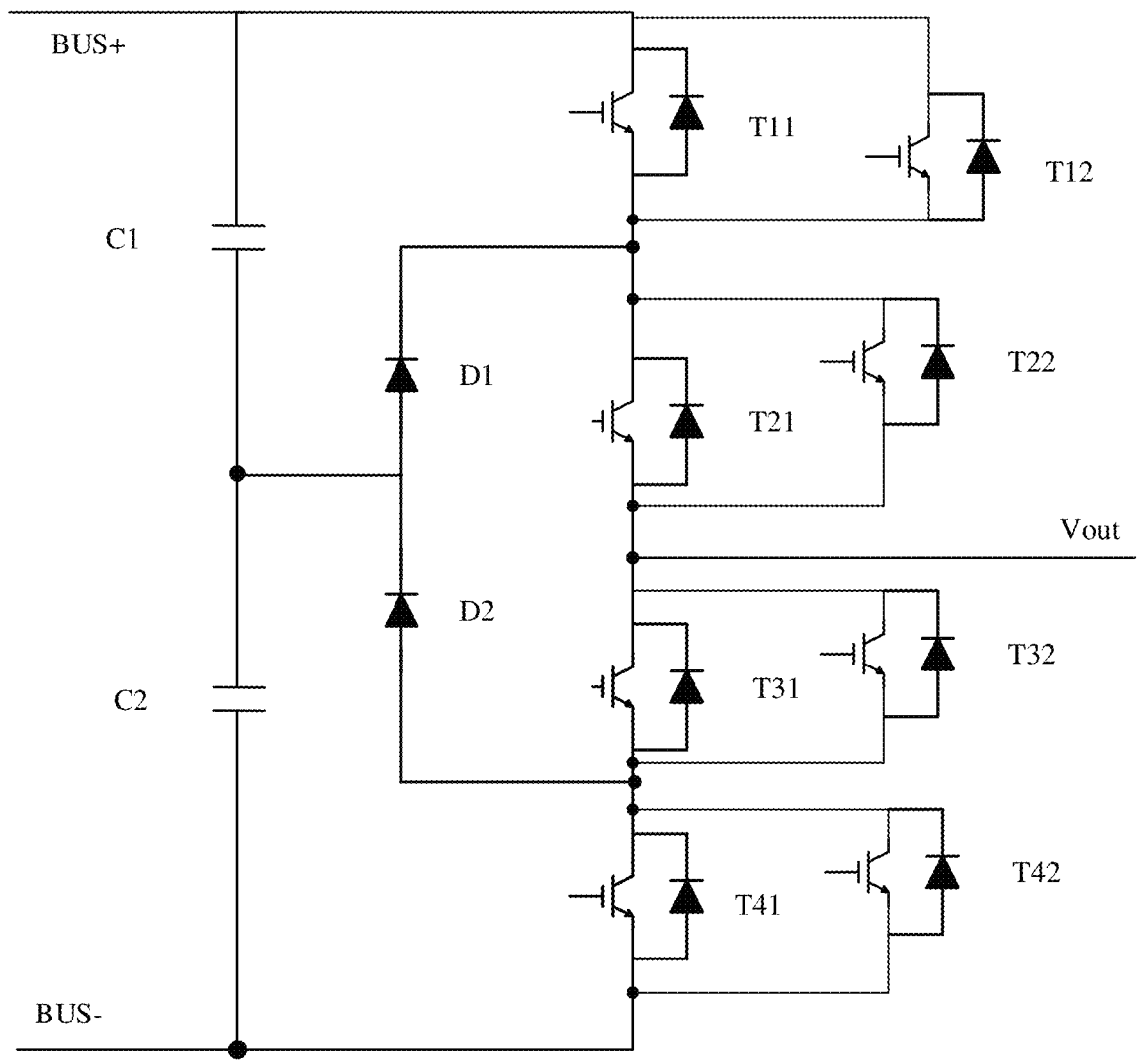
FIG. 5B is a schematic diagram of another three-level NPC inverter according to an embodiment.

The three-level NPC inverter provided in this embodiment may include at least the following four switch units: a first switch unit, a second switch unit, a third switch unit, and a fourth switch unit. A first end of the first switch unit is connected to a positive direct current bus. A second end of the first switch unit is connected to a first end of the second switch unit. A second end of the second switch unit is connected to a first end of the third switch unit. A second end of the third switch unit is connected to a first end of the fourth switch unit. A second end of the fourth switch unit is connected to a negative direct current bus. The second end of the second switch unit is an output end of the three-level neutral point clamped inverter. An implementation of the four switch units is not limited in this embodiment. For example, each switch unit may include one or more switching transistors. For example, each switch unit includes two switching transistors. FIG. 5B is a schematic diagram of another three-level NPC inverter according to an embodiment.

This embodiment uses an example in which each switch unit includes two switching transistors connected in parallel. Because a current that may be borne by a single switching transistor is limited, when the current is relatively large, the single switching transistor may be damaged. Therefore, a function of one switch may be implemented by using a plurality of switching transistors connected in parallel, and time sequences of drive signals of the plurality of switching transistors connected in parallel are the same, that is, the plurality of switching transistors connected in parallel simultaneously operate and are simultaneously turned off or turned on. The plurality of switching transistors may be connected in parallel, so that a current that may pass through the entire switch unit may be increased. For example, the first switch unit includes switching transistors T11 and T12, the second switch unit includes switching transistors T21 and T22, the third switch unit includes switching transistors T31 and T32, and the fourth switch unit includes switching transistors T41 and T42.

First ends of the switching transistors T11 and T12 are both connected to a positive direct current bus BUS+. Second ends of the switching transistors T11 and T12 are connected to first ends of the switching transistors T21 and T22. Second ends of the switching transistors T21 and T22 are connected to first ends of the switching transistors T31 and T32. Second ends of the switching transistors T31 and T32 are connected to first ends of the switching transistors T41 and T42. Second ends of the switching transistors T41 and T42 are connected to a negative direct current bus BUS−. The second ends of the switching transistors T21 and T22 are output ends of the three-level neutral point clamped inverter.

In FIG. 5B, only two switching transistors are connected in parallel to implement a function of one switch. Alternatively, more switching transistors may be connected in parallel, for example, three or four switching transistors. Details are not described herein again.

With reference to the accompanying drawings, the following describes in detail a working principle of a photovoltaic system according to an embodiment.

Figure 6:
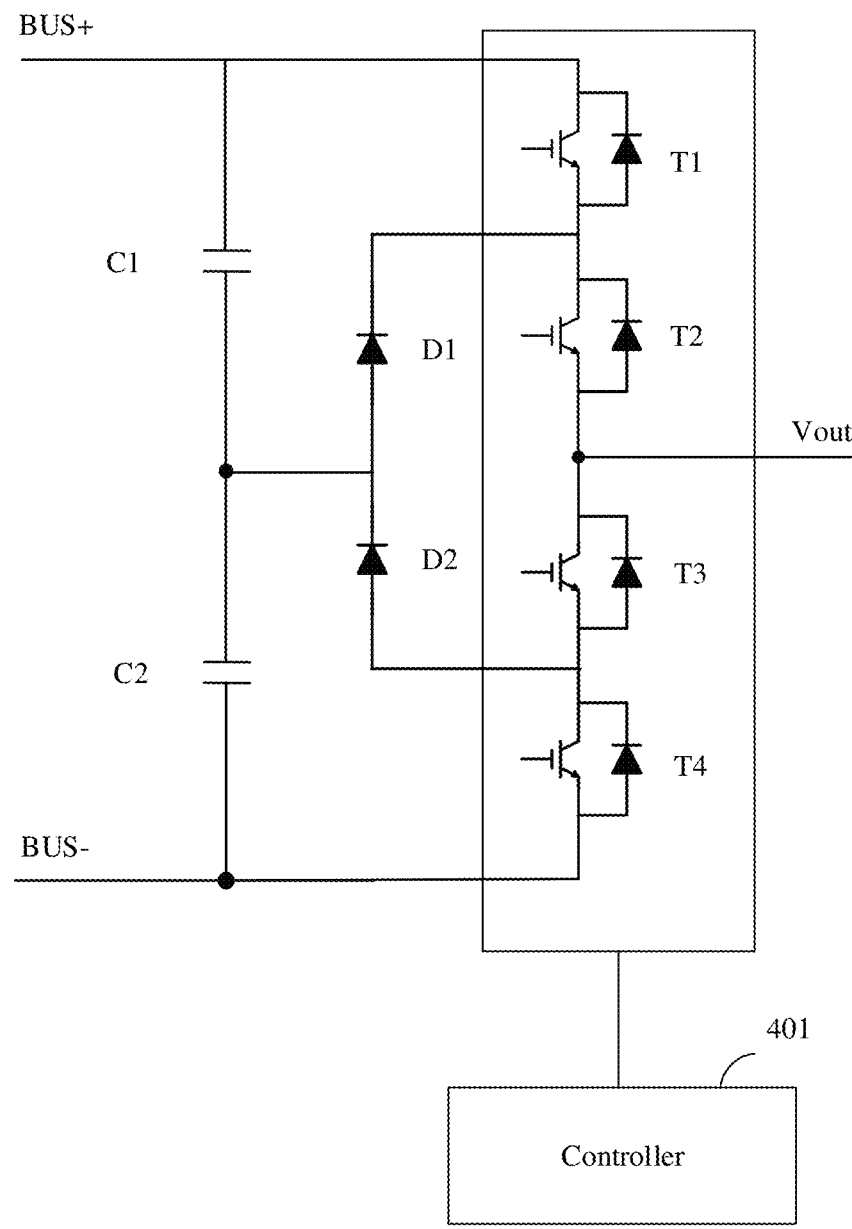
FIG. 6 is a schematic diagram of a photovoltaic system according to an embodiment.

FIG. 6 is a schematic diagram of a photovoltaic system according to an embodiment.

The photovoltaic system according to this embodiment includes: a three-level neutral point clamped inverter and a controller 401.

The three-level neutral point clamped inverter includes at least the following four switching transistors: a first switching transistor T1, a second switching transistor T2, a third switching transistor T3, and a fourth switching transistor T4. A first end of the first switching transistor T1 is connected to a positive direct current bus. A second end of the first switching transistor T1 is connected to a first end of the second switching transistor T2. A second end of the second switching transistor T2 is connected to a first end of the third switching transistor T3. A second end of the third switching transistor T3 is connected to a first end of the fourth switching transistor T4. A second end of the fourth switching transistor T4 is connected to a negative direct current bus. The second end of the second switching transistor T2 is an output end of the three-level neutral point clamped inverter, and an output voltage of the output end is Vout. Usually, the output end of the inverter is connected to an inductor.

The controller 401 is configured to: when an average value of an output current of the three-level neutral point clamped inverter is greater than a first current threshold or less than a second current threshold, control only one of the four switching transistors to perform a high-frequency operation, to reduce power consumption caused by a high-frequency operation.

The controller 401 may be an independently disposed controller in the photovoltaic system or may be a controller integrated with the inverter. This is not limited in this embodiment.

The output current of the inverter is positive when flowing out of the inverter and is negative when flowing into the inverter. An absolute value of the first current threshold may be equal to or not equal to an absolute value of the second current threshold. When the absolute value of the first current threshold is not equal to the absolute value of the second current threshold, the absolute value of the first current threshold may be greater than the absolute value of the second current threshold, or the absolute value of the first current threshold may be less than the absolute value of the second current threshold.

When the absolute value of the first current threshold is equal to the absolute value of the second current threshold, the second current threshold and the first current threshold are symmetric about a point 0, in other words, a preset interval is a symmetric interval about the point 0.

The average value of the output current is an average value of the output current of the three-level neutral point clamped inverter in a switching cycle. The first current threshold is a positive number, and the second current threshold is a negative number. In other words, the first current threshold I1 is a number greater than 0, and the second current threshold is a number less than 0 According to the embodiment, when the average value of the output current of the inverter is outside a preset interval near 0, one switching transistor is controlled to perform a high-frequency operation. Only when the average value of the output current of the inverter is in the preset interval near 0, two switching transistors are controlled to perform high-frequency operations. That is, the controller 401 is further configured to: when the average value of the output current is greater than the second current threshold and less than the first current threshold, control two of the four switching transistors to perform high-frequency operations.

Figure 7:
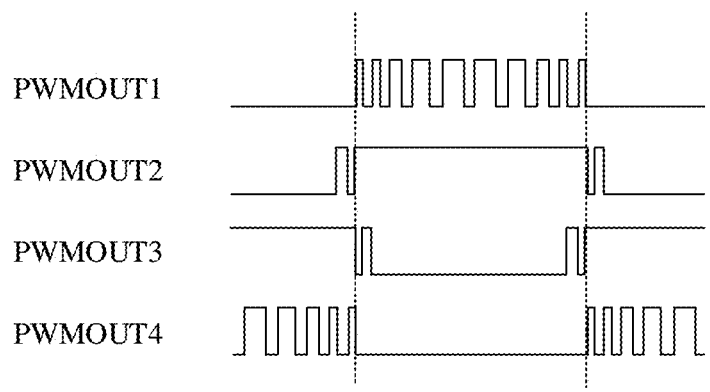
FIG. 7 is a drive time sequence diagram of a three-level NPC inverter in a photovoltaic system according to an embodiment.

To make persons skilled in the art better understand advantages of the embodiment, the following analyzes working principles of the embodiment with reference to FIG. 6 and FIG. 7.

FIG. 7 is a drive time sequence diagram of a three-level NPC inverter in a photovoltaic system according to an embodiment.

To distinguish from the pulse drive signals in FIG. 5A, four pulse drive signals in FIG. 7 provided in this embodiment are respectively represented by PWMOUT1, PWMOUT1, PWMOUT1, and PWMOUT1. The foregoing four pulse drive signals are respectively pulse drive signals of four switching transistors T1 to T4 of the inverter.

It can be seen from FIG. 7 that, in most time periods of a positive half cycle of an output voltage, only one switching transistor performs a high-frequency operation, that is, only the first switching transistor T1 performs a high-frequency operation. In only fewer time periods of the positive half cycle, the third switching transistor T3 performs a high-frequency operation. The third switching transistor T3 is turned off in most other time periods.

Similarly, in most time periods of a negative half cycle of the output voltage, only one switching transistor performs a high-frequency operation, that is, only the fourth switching transistor T4 performs a high-frequency operation. In only fewer time periods of the negative half cycle, the second switching transistor T2 performs a high-frequency operation.

A time period of high-frequency operations of the second switching transistor T2 and the third switching transistor T3 may be implemented by detecting an output current of the inverter. It should be understood that the output current of the inverter is an output current of a bridge arm of the inverter, that is, an output current of a second end of the second switching transistor T2. The output current, similar to the output voltage, is an alternating current parameter, and may be positive or negative. In addition, due to existence of a ripple current, the output current is superimposed by the ripple current based on a sine wave.

Figure 8:
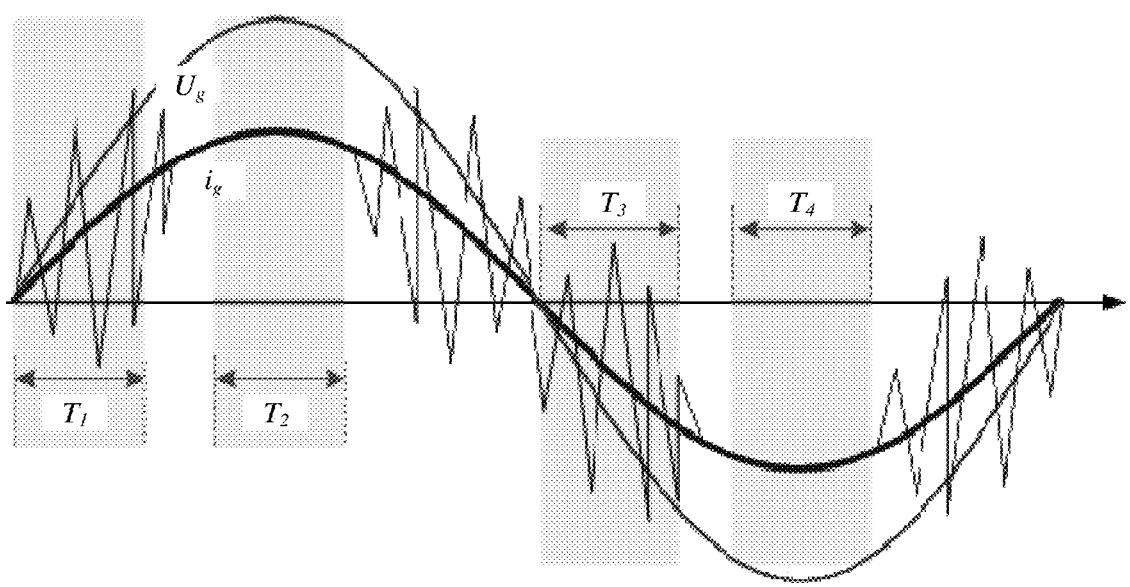
FIG. 8 is a schematic diagram of a waveform of an output current of an inverter according to an embodiment.

For details, refer to FIG. 8. FIG. 8 is a schematic diagram of a waveform of an output current of an inverter according to an embodiment.

In FIG. 8, a sine wave $U_g$ with a relatively large amplitude represents an output voltage, a sine wave $i_g$ with a relatively small amplitude represents an output current, and a sawtooth wave represents a ripple current.

The ripple current may be relatively small. When a current amplitude of a sine wave is relatively large, even if the ripple current is superimposed, a superimposed output current is not sometimes positive and sometimes negative. However, when an output current amplitude of the sine wave is relatively small, the ripple current sometimes increases and sometimes decreases in one switching cycle. Therefore, if the relatively small output current is superimposed by the ripple current, the superimposed output current may be sometimes positive and sometimes negative.

For example, in FIG. 8, in a time period $T_1$ of a positive half cycle of the output voltage, the output current superimposed by the ripple current is likely to be sometimes positive and sometimes negative. In this case, two switching transistors need to be controlled to perform high-frequency operations, to provide a current path for the output current that is sometimes positive and sometimes negative. In a time period $T_2$ of the positive half cycle of the output voltage, because an amplitude of the sine wave is relatively large, the output current superimposed by the ripple current is not sometimes positive and sometimes negative. Therefore, only one switching transistor is controlled to perform a high-frequency operation, and no more current paths need to be provided.

Similarly, in FIG. 8, in a time period $T_3$ of a negative half cycle of the output voltage, because the output current amplitude of the sine wave is relatively small, the output current superimposed by the ripple current is sometimes positive and sometimes negative. Therefore, two switching transistors need to be controlled to perform high-frequency operations, to provide a current path for the output current that is sometimes positive and sometimes negative. In a time period $T_4$ of the negative half cycle of the output voltage, because the amplitude of the sine wave is relatively large, the output current superimposed by the ripple current is not sometimes positive and sometimes negative. Therefore, only one switching transistor is controlled to perform a high-frequency operation, and no more current paths need to be provided.

It can be seen from FIG. 8 that, in only fewer time periods corresponding to alternating positive and negative half cycles of the output voltage, the two switching transistors are controlled to perform high-frequency operations. In other time periods, only one switching transistor performs a high-frequency operation. Therefore, in comparison with the control manner shown in FIG. 5, a high-frequency loss of the switching transistor may be reduced.

An actually detected output current is a sine-wave current superimposed by a sawtooth-wave ripple current. Therefore, to more accurately control an operation of the switching transistor of the inverter, an average value of the output current corresponding to one switching cycle of the switching transistor of the inverter may be separately compared with a first current threshold and a second current threshold.

The following describes a principle of setting the first current threshold and the second current threshold.

In a possible implementation, in one power frequency cycle, that is, a power frequency cycle corresponding to the output voltage of the inverter, based on a conventional control manner, two switching transistors perform complementary operations at high frequency in each half cycle of the output voltage. That is, T1 and T3 perform complementary operations at high frequency, and T2 and T4 perform complementary operations at high frequency. A minimum value, a maximum value, and an average value of the output current of the inverter in one switching cycle are obtained. When the minimum value of the output current in one switching cycle is 0, it indicates that the output current in the switching cycle is in a positive half cycle. In this case, the average value of the output current in the switching cycle is greater than 0 and is denoted as a first average current. In this case, the first current threshold is greater than or equal to the average value of the output current corresponding to the switching cycle, in other words, the average value of the output current is a lower limit value of the first current threshold. When the maximum value of the output current in one switching cycle is 0, it indicates that the output current in the switching cycle is in a negative half cycle. In this case, the average value of the output current in the switching cycle is less than 0 and is denoted as a second average current. In this case, the second current threshold is less than or equal to the average value of the output current corresponding to the switching cycle, in other words, the average value of the output current is an upper limit value of the second current threshold.

During implementation, in a positive half cycle of an output voltage of a three-level neutral point clamped inverter, a controller is further configured to: control a second switching transistor to be turned on, and control a fourth switching transistor to be turned off; if the average value of the output current is greater than the first current threshold, control a third switching transistor to be turned off, and control a first switching transistor to perform a high-frequency operation; and if the average value of the output current is less than the second current threshold, control the first switching transistor to be turned off, and control the third switching transistor to perform a high-frequency operation.

In a negative half cycle of the output voltage, the controller is further configured to: control the third switching transistor to be turned on, and control the first switching transistor to be turned off; if the average value of the output current is greater than the first current threshold, control the fourth switching transistor to be turned off, and control the second switching transistor to perform a high-frequency operation; and if the average value of the output current is less than the second current threshold, control the second switching transistor to be turned off, and control the fourth switching transistor to perform a high-frequency operation.

In comparison with FIG. 5, two switching transistors perform switching operations in both the positive half cycle and the negative half cycle of the output voltage. Therefore, according to a control manner for the three-level inverter provided in this embodiment, a quantity of switching transistors that perform high-frequency operations is reduced, and two switching transistors perform high-frequency operations in only some time periods. Therefore, a switching loss of the switching transistor is reduced, power consumption caused by the high-frequency operation is reduced, and electric energy conversion efficiency of the three-level NPC inverter is improved. In addition, only to provide a current path, two switching transistors perform high-frequency operations in fewer time periods of the positive half cycle and the negative half cycle of the output voltage.

The following describes a reason why the output current of the inverter is compared with a preset current threshold, and the switching transistor is controlled, based on a comparison result, to operate in this embodiment.

An output end of the inverter may be connected to an inductor (not shown in the figure). Therefore, the magnitude of the ripple current may be related to a magnitude of the inductor. A larger inductance of the inductor indicates a smaller ripple current, and a smaller inductance of the inductor indicates a larger ripple current. If a working condition of the inverter is fixed, for example, a bus voltage is fixed, power is fixed, and an inductance is fixed, after a fundamental component of the output current reaches a degree, that is, the fundamental component of the output current is greater than the preset current threshold, and a variation of the ripple current is less than the preset current threshold, the output current is greater than 0, or the output current is less than 0, but does not fluctuate between positive and negative values. Therefore, two switching transistors do not need to perform high-frequency operations, and one of the two switching transistors is used to improve a current path.

In addition to the inverter and the controller, the photovoltaic system further includes a current sampling circuit, configured to collect the output current of the inverter. The controller may obtain the average value of the output current in one switching cycle by using a plurality of sampling currents at a plurality of sampling moments in one switching cycle that are collected by the current sampling circuit. Sampling does not need to be performed in the positive half cycle and the negative half cycle of the output voltage. When the inverter is controlled, a reference voltage may be set to control the output voltage. Therefore, the controller may determine the positive half cycle and the negative half cycle of the output voltage of the inverter separately based on a positive half cycle and a negative half cycle of the known reference voltage.

Figure 9:
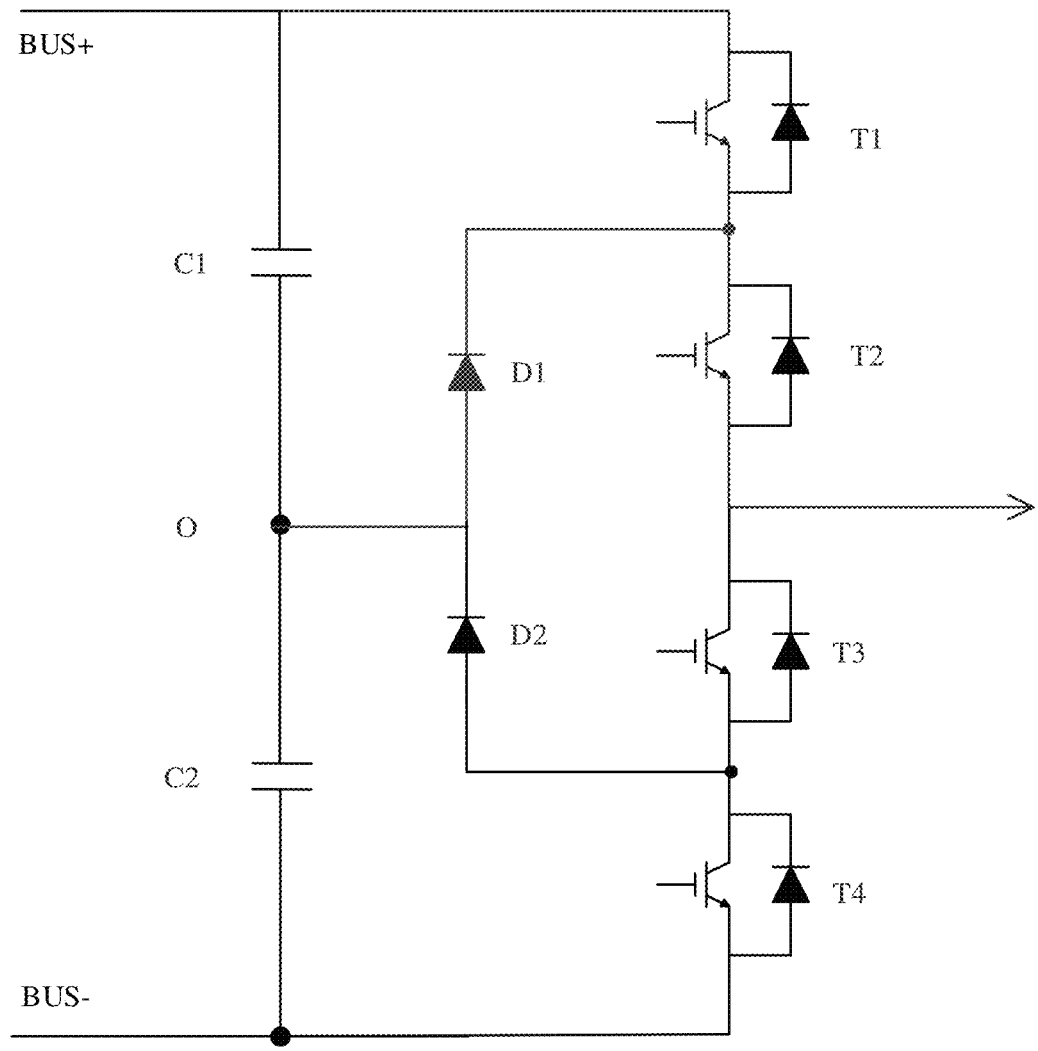
FIG. 9 is a schematic diagram corresponding to a high-frequency operation of a first switching transistor in a positive half cycle of an output voltage according to an embodiment.
Figure 10:
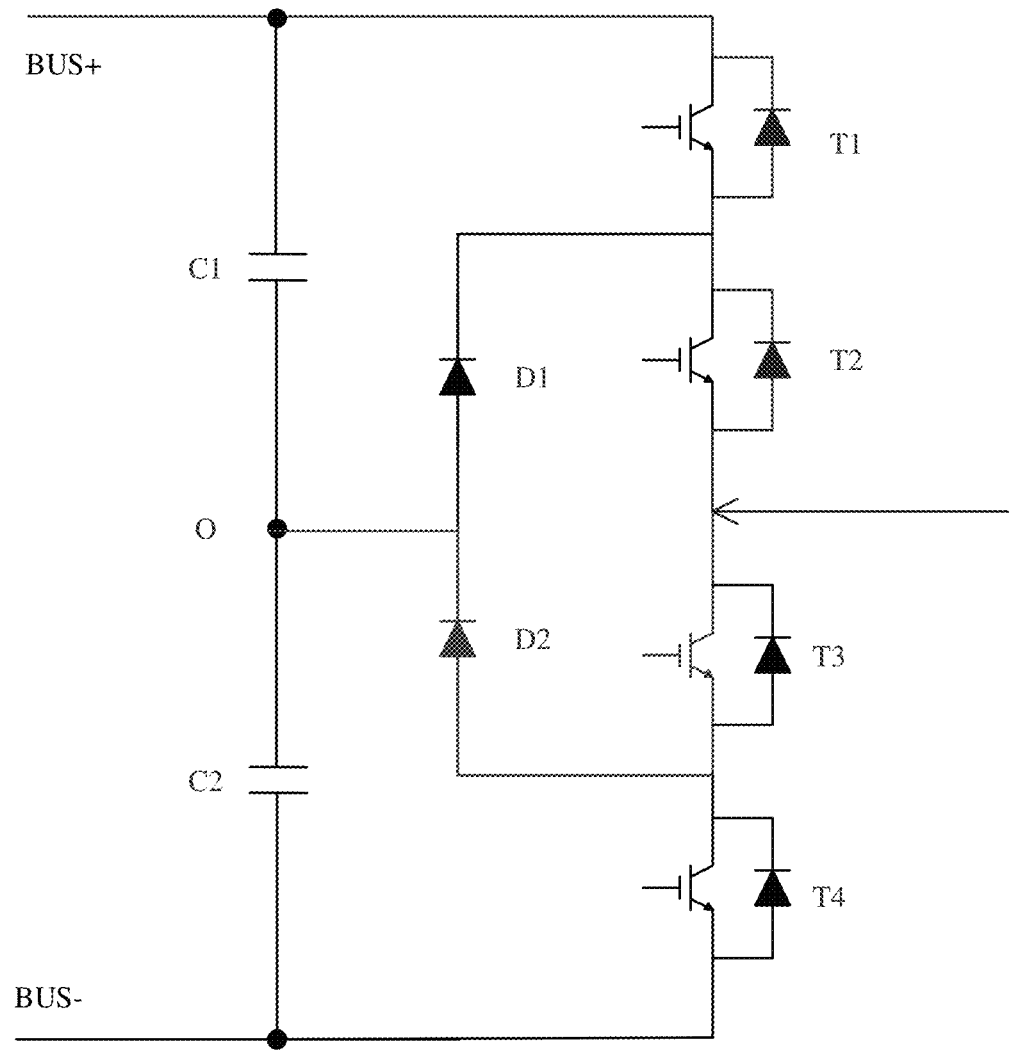
FIG. 10 is a schematic diagram corresponding to a high-frequency operation of a third switching transistor in a positive half cycle of an output voltage according to an embodiment.

The following analyzes a control manner for a switching transistor corresponding to a positive half cycle of an output voltage of an inverter with reference to FIG. 9 and FIG. 10. FIG. 9 is a schematic diagram corresponding to a high-frequency operation of a first switching transistor in a positive half cycle of an output voltage according to an embodiment.

FIG. 10 is a schematic diagram corresponding to a high-frequency operation of a third switching transistor in a positive half cycle of an output voltage according to an embodiment.

As shown in FIG. 9 and FIG. 10, in the positive half cycle of the output voltage of the inverter, a second switching transistor T2 is controlled to be always turned on, and a fourth switching transistor T4 is controlled to be always turned off.

As shown in FIG. 9, when an average value of an output current of the inverter is greater than a first current threshold, the first switching transistor T1 is controlled to perform a high-frequency operation, and the third switching transistor T3 is controlled to be turned off. That is, T1 performs a switching operation at a frequency higher than a power frequency, and T3 is always turned off. In this case, a current path is switched between the first switching transistor T1 and a first diode D1.

For example, when the first switching transistor T1 is turned on, because the second switching transistor T2 is always turned on, the current path is from BUS+ to an output end through T1 and T2 sequentially. When the first switching transistor T1 is turned off, the current path is from a midpoint O of a direct current bus, such as a common end of C1 and C2, to the output end through the first diode D1 and the second switching transistor T2.

It can be understood from the foregoing analysis with reference to FIG. 9 that, during the high-frequency operation of the first switching transistor T1, the third switching transistor T3 is turned off and does not perform a high-frequency operation, and the current path is not affected.

As shown in FIG. 10, when the average value of the output current of the inverter is less than a second current threshold, because the second current threshold is a negative number, the output current of the inverter flows from outside into a second end of the second switching transistor T2, as shown by an arrow in FIG. 10. In this case, the first switching transistor T1 is controlled to be turned off, and the third switching transistor T3 is controlled to perform a high-frequency operation. That is, T1 is always turned off, and T3 performs a switching operation at a frequency higher than a power frequency. In this case, the current path is switched between the third switching transistor T3 and a second diode D2.

For example, when the third switching transistor T3 is turned on, the output current reaches the midpoint O of the direct current bus through the third switching transistor T3 and the second diode D2. When the third switching transistor T3 is turned off, the current path is from an anti-parallel diode of the second switching transistor T2 and an anti-parallel diode of the first switching transistor T1 to a positive direct current bus BUS+.

It can be understood from the foregoing analysis with reference to FIG. 10 that, during the high-frequency operation of the third switching transistor T3, the first switching transistor T1 is turned off and does not perform a high-frequency operation, and the current path is not affected.

The foregoing analyzes the switching operation in the positive half cycle of the output voltage of the inverter with reference to FIG. 9 and FIG. 10. The following analyzes a control manner for a switching transistor corresponding to a negative half cycle of an output voltage of an inverter with reference to FIG. 11 and FIG. 12.

Figure 11:
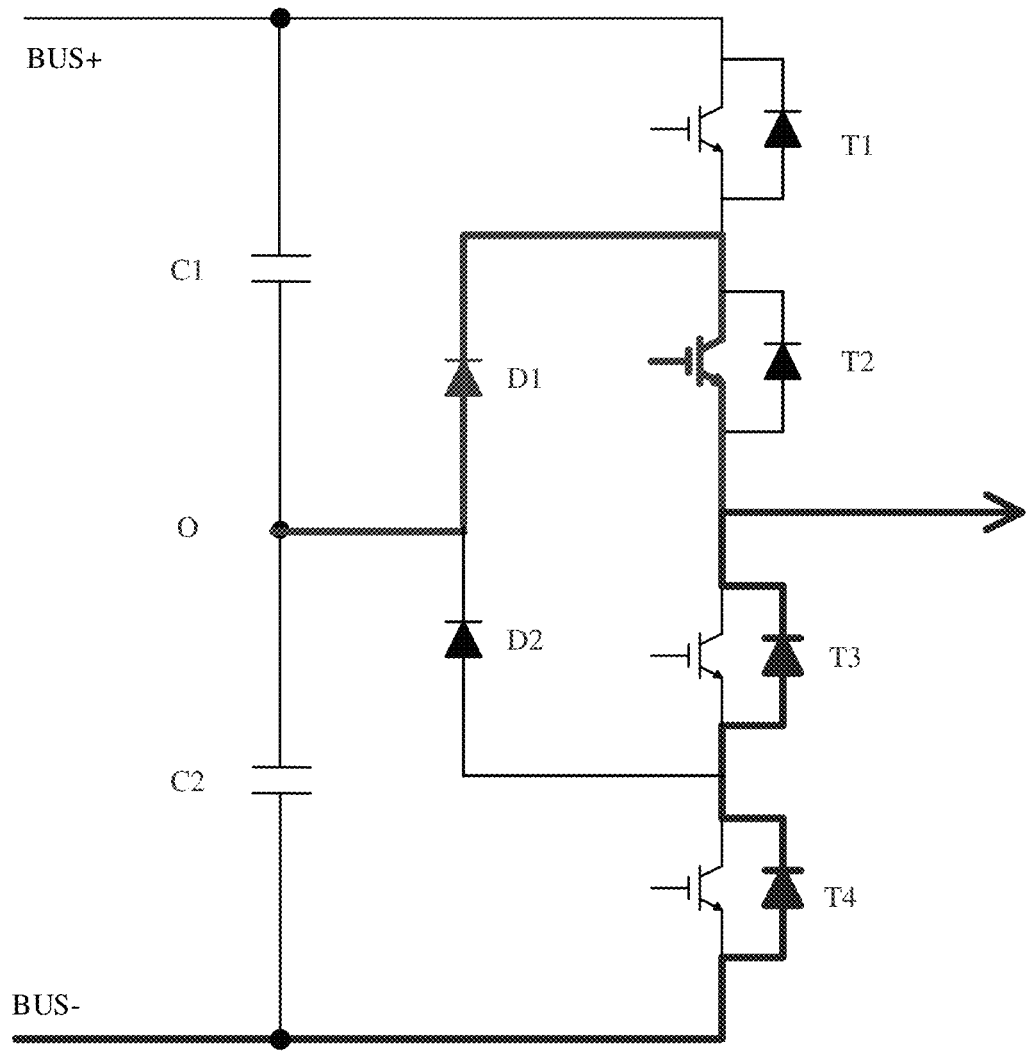
FIG. 11 is a schematic diagram corresponding to a high-frequency operation of a second switching transistor in a negative half cycle of an output voltage according to an embodiment.

FIG. 11 is a schematic diagram corresponding to a high-frequency operation of a second switching transistor in a negative half cycle of an output voltage according to an embodiment.

Figure 12:
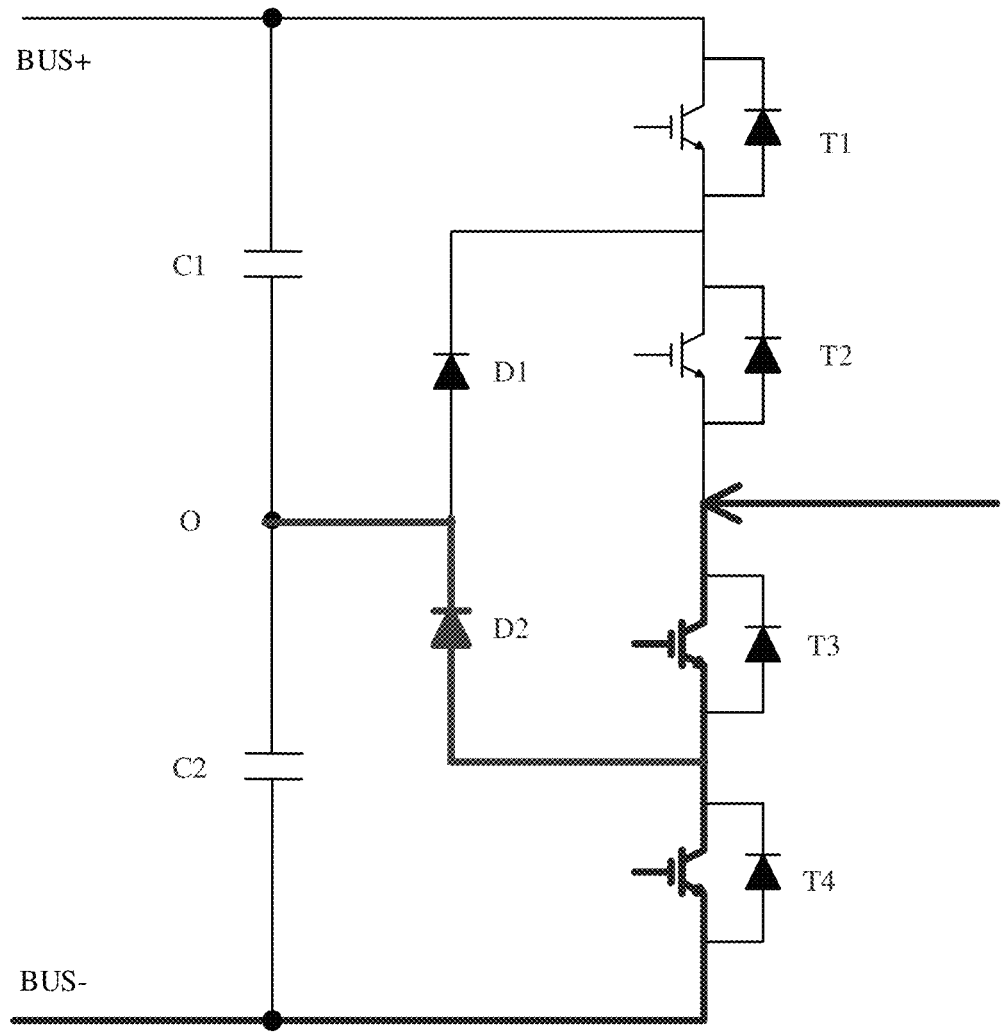
FIG. 12 is a schematic diagram corresponding to a high-frequency operation of a fourth switching transistor in a negative half cycle of an output voltage according to an embodiment.

FIG. 12 is a schematic diagram corresponding to a high-frequency operation of a fourth switching transistor in a negative half cycle of an output voltage according to an embodiment.

As shown in FIG. 11 and FIG. 12, in the negative half cycle of the output voltage of the inverter, a third switching transistor T3 is controlled to be always turned on, and a first switching transistor T1 is controlled to be always turned off.

As shown in FIG. 11, when an average value of an output current of the inverter is greater than a first current threshold, a fourth switching transistor T4 is controlled to be always turned off, and a second switching transistor T2 is controlled to perform a high-frequency operation, that is, T2 performs a switching operation at a frequency higher than a power frequency. In this case, a current path is switched between the second switching transistor T2 and a first diode D1.

For example, when the second switching transistor T2 is turned on, the current path is from a midpoint O of a direct current bus to an output end through the first diode D1 and the second switching transistor T2. When the second switching transistor T2 is turned off, the current path is from a negative direct current bus BUS− to the output end through an anti-parallel diode of the fourth switching transistor T4 and an anti-parallel diode of the third switching transistor T3.

It can be understood from the foregoing analysis with reference to FIG. 11 that, during the high-frequency operation of the second switching transistor T2, the fourth switching transistor T4 is turned off and does not perform a high-frequency operation, and the current path is not affected.

As shown in FIG. 12, when the average value of the output current of the inverter is less than a second current threshold, because the second current threshold is a negative number, the output current of the inverter flows from outside into a second end of the second switching transistor T2, as shown by an arrow in FIG. 12. In this case, the second switching transistor T2 is controlled to be turned off, and the fourth switching transistor T4 is controlled to perform a high-frequency operation, that is, T2 is always turned off, and T4 performs a switching operation at a frequency higher than the power frequency. In this case, the current path is switched between the fourth switching transistor T4 and a second diode D6.

For example, when the fourth switching transistor T4 is turned on, because the third switching transistor T3 is always turned on, the current path is from the third switching transistor T4 and the fourth switching transistor T4 to the negative direct current bus BUS–. When the fourth switching transistor T4 is turned off, because the third switching transistor T3 is always turned on, the current path is from the third switching transistor T3 and the second diode D2 to the midpoint O of the direct current bus.

It can be understood from the foregoing analysis with reference to FIG. 12 that, during the high-frequency operation of the fourth switching transistor T4, the second switching transistor T2 is turned off and does not perform a high-frequency operation, and the current path is not affected.

In an implementation, the first current threshold and the second current threshold may be fixed values. In other words, after the first current threshold and the second current threshold are set, the values of the first current threshold and the second current threshold are not adjusted.

In another implementation, to more accurately control an operation of each switching transistor in the inverter, the first current threshold or the second current threshold or both may be adjusted based on an actual working condition. In other words, only the first current threshold may be adjusted, or only the second current threshold may be adjusted, or both the first current threshold and the second current threshold may be adjusted. Parameters that may be affected by an actual working condition include: a total harmonic current distortion of the output current, a modulation ratio of the three-level neutral point clamped inverter, a power factor of the inverter, or an output power of the three-level neutral point clamped inverter.

The following first describes four adjustment principles of the first current threshold. During implementation, the first current threshold may be adjusted according to any one of the following principles.

A first adjustment principle:

A controller is further configured to: obtain the THDi of the output current; and if the THDi increases, increase the first current threshold; or if the THDi decreases, decrease the first current threshold.

For example, when the first current threshold is set to an excessively small value that may be inappropriate, a harmonic of the output current increases. As a result, the THDi increases. Therefore, to decrease the harmonic, the first current threshold may be set to a larger value.

A second adjustment principle:

A controller is further configured to: obtain the modulation ratio of the three-level neutral point clamped inverter; and if the modulation ratio decreases, increase the first current threshold; or if the modulation ratio increases, decrease the first current threshold. The modulation ratio is a ratio of an output phase voltage peak of the three-level neutral point clamped inverter to a half direct current bus voltage, such as a ratio of an output phase voltage peak to a half direct current bus voltage.

The modulation ratio represents a voltage difference between the output phase voltage peak and the half direct current bus voltage. When the voltage difference between the output phase voltage peak and the half direct current bus voltage is smaller, that is, the output phase voltage peak and the half direct current bus voltage two are closer, the modulation ratio is larger. When the voltage difference between the output phase voltage peak and the half direct current bus voltage is larger, the modulation ratio is smaller. To ensure that a ripple current on an inductor is small, it is expected that the voltage difference between the output phase voltage peak and the half direct current bus voltage is smaller. Therefore, when the modulation ratio increases, the first current threshold needs to be decreased. That is, the switching transistor is more accurately controlled to perform a high-frequency operation, to improve the ripple current.

A third adjustment principle:

A controller is further configured to: obtain the power factor of the three-level neutral point clamped inverter; and if an absolute value of the power factor decreases, increase the first current threshold; or if an absolute value of the power factor increases, decrease the first current threshold.

When the power factor of the inverter decreases, it indicates that the inverter transmits reactive power to an alternating current grid. In this case, a ripple current is relatively large. Therefore, the first current threshold needs to be increased.

A fourth adjustment principle:

A controller is further configured to: obtain the output power of the three-level neutral point clamped inverter; and if the output power decreases, increase the first current threshold; or if the output power increases, decrease the first current threshold.

Because an instantaneous value of the output current of the inverter is an average value of the output current superimposed by a ripple current, the output power is positively correlated with the average value of the output current. Therefore, when the output power decreases, a valid value of the output current is smaller, and the first current threshold needs to be increased. On the contrary, when the output power increases, the average value of the output current increases, and the first current threshold may be decreased.

The following describes four adjustment principles of the second current threshold. During implementation, the second current threshold may be adjusted according to any one of the following principles. The first current threshold is a positive number greater than 0, and the second current threshold is a negative number less than 0. Therefore, when the first current threshold and the second current threshold are adjusted based on a same parameter, the first current threshold and the second current threshold tend to be adjusted in opposite directions.

A first adjustment principle:

A controller is further configured to: obtain the total harmonic current distortion of the output current; and if the total harmonic current distortion increases, decrease the second current threshold; or if the total harmonic current distortion decreases, increase the second current threshold.

A second adjustment principle:

A controller is further configured to: obtain the modulation ratio of the three-level neutral point clamped inverter; and if the modulation ratio decreases, decrease the second current threshold; or if the modulation ratio increases, increase the second current threshold. The modulation ratio is the ratio of the output phase voltage peak of the three-level neutral point clamped inverter to the half direct current bus voltage, such as the ratio of the output phase voltage peak to the half direct current bus voltage.

A third adjustment principle:

A controller is further configured to: obtain the power factor of the three-level neutral point clamped inverter; and if the absolute value of the power factor decreases, decrease the second current threshold; or if the absolute value of the power factor increases, increase the second current threshold.

A fourth adjustment principle:

A controller is further configured to: obtain the output power of the three-level neutral point clamped inverter; and if the output power decreases, decrease the second current threshold; or if the output power increases, increase the second current threshold.

A topology architecture of the photovoltaic system provided in embodiments is not limited. For example, the topology architecture may be any architecture shown in FIG. 1 to FIG. 3. Correspondingly, the three-level NPC inverter described above may be a central inverter, a string inverter, or a household single-phase inverter. This is not limited in embodiments. Most photovoltaic systems transmit active power to a grid, and an output voltage and an output current of an inverter are in a same direction. Therefore, a time period in which the output voltage and the output current are in different directions is very short. The solutions provided in embodiments may greatly reduce a switching loss of a switching transistor, such as a switching loss caused by a high-frequency operation, and improve power generation efficiency of a photovoltaic system. Only one switching transistor performs a high-frequency operation in most time periods. Therefore, during the high-frequency operation of only one switching transistor, setting of a dead time may be reduced, or no dead time is set. In this way, the THDi of the output current of the inverter may be improved.

The three-level NPC inverter in the photovoltaic system described in the foregoing embodiments may be a central inverter, or a string inverter, or a household single-phase inverter. The three-level NPC inverter in embodiments is not only applicable to a photovoltaic system, but also applicable to another power system, such as a power supply of a data center or a power supply system of a base station. In addition, the three-level NPC inverter is further applicable to the field of electric vehicles, and the like. Therefore, an application scenario of the three-level NPC inverter is not limited in embodiments.

The following describes a three-level NPC inverter provided in an embodiment. For an implementation, refer to the description of the foregoing embodiments of the photovoltaic system. Corresponding beneficial effects are also applicable to the following embodiments of the inverter. The following briefly describes only an implementation of the three-level NPC inverter.

Figure 13:
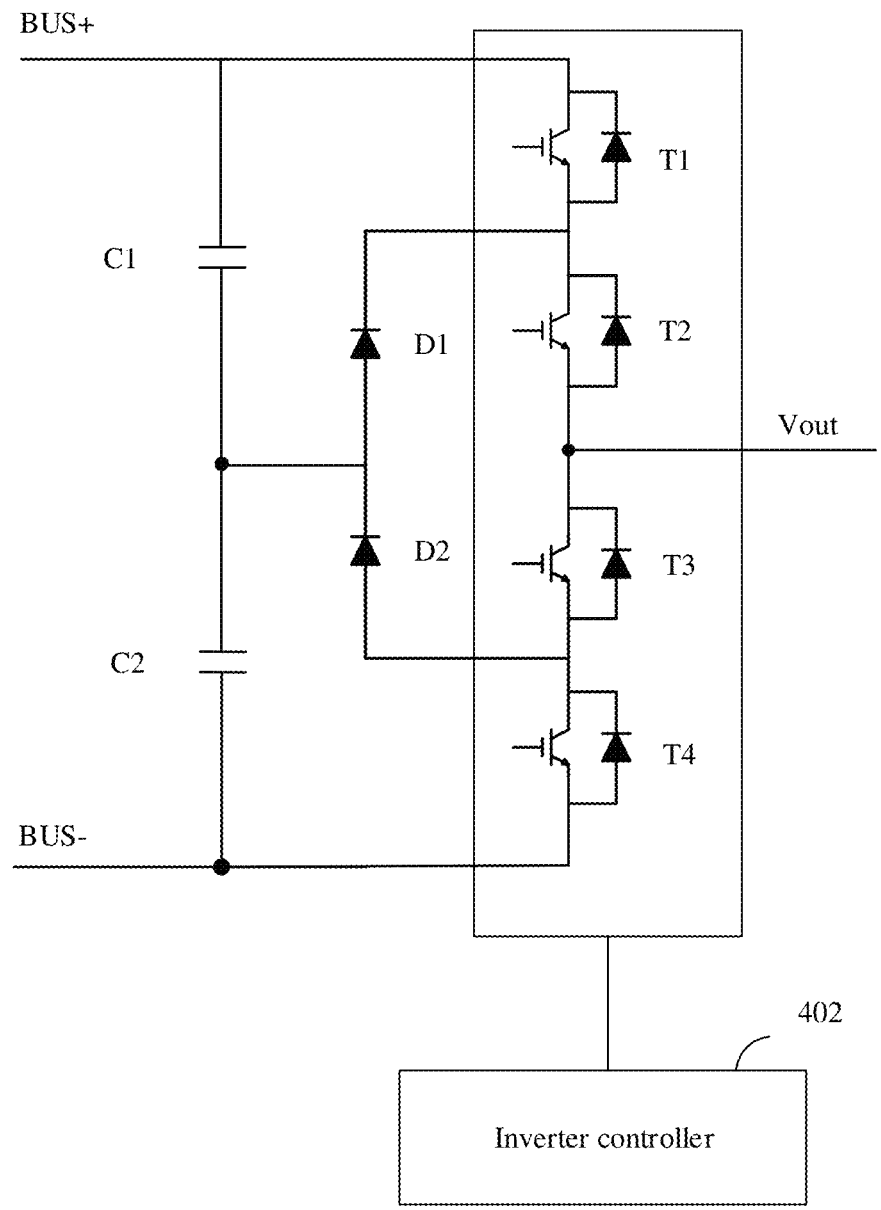
FIG. 13 is a schematic diagram of another three-level NPC inverter according to an embodiment.

FIG. 13 is a schematic diagram of a three-level NPC inverter according to an embodiment.

The three-level NPC inverter provided in this embodiment includes at least the following four switching transistors: a first switching transistor T1, a second switching transistor T2, a third switching transistor T3, and a fourth switching transistor T4. A first end of the first switching transistor T1 is connected to a positive direct current bus BUS+. A second end of the first switching transistor T1 is connected to a first end of the second switching transistor T2. A second end of the second switching transistor T2 is connected to a first end of the third switching transistor T3.

A second end of the third switching transistor T3 is connected to a first end of the fourth switching transistor T4. A second end of the fourth switching transistor T4 is connected to a negative direct current bus BUS−. The second end of the second switching transistor T2 is an output end of the three-level neutral point clamped inverter, such as Vout.

The inverter further includes: an inverter controller 402, configured to: when an average value of an output current of the three-level neutral point clamped inverter is greater than a first current threshold or less than a second current threshold, control only one of the four switching transistors to perform a high-frequency operation, to reduce power consumption caused by a high-frequency operation. The average value of the output current is an average value of the output current of the three-level neutral point clamped inverter in a switching cycle. The output current of the inverter is positive when flowing out of the inverter and is negative when flowing into the inverter. The first current threshold is a positive number, and the second current threshold is a negative number.

In a positive half cycle of an output voltage of the three-level neutral point clamped inverter, the inverter controller 402 is further configured to: control the second switching transistor to be turned on, and control the fourth switching transistor to be turned off; if the average value of the output current is greater than the first current threshold, control the third switching transistor to be turned off, and control the first switching transistor to perform a high-frequency operation; and if the average value of the output current is less than the second current threshold, control the first switching transistor to be turned off, and control the third switching transistor to perform a high-frequency operation.

In a negative half cycle of the output voltage, the inverter controller is further configured to: control the third switching transistor to be turned on, and control the first switching transistor to be turned off; if the average value of the output current is greater than the first current threshold, control the fourth switching transistor to be turned off, and control the second switching transistor to perform a high-frequency operation; and if the average value of the output current is less than the second current threshold, control the second switching transistor to be turned off, and control the fourth switching transistor to perform a high-frequency operation.

The inverter controller 402 is further configured to adjust the first current threshold based on any one of the following parameters: a total harmonic current distortion of the output current, a modulation ratio of the three-level neutral point clamped inverter, a power factor of the inverter, or an output power of the three-level neutral point clamped inverter.

The inverter controller 402 is further configured to adjust the second current threshold based on any one of the following parameters: the total harmonic current distortion of the output current, the modulation ratio of the three-level neutral point clamped inverter, the power factor of the inverter, or the output power of the three-level neutral point clamped inverter.

For a manner in which the inverter controller 402 adjusts the first current threshold and the second current threshold based on any one of the foregoing parameters, refer to the description of the foregoing photovoltaic system embodiment.

As shown in FIG. 13, the three-level neutral point clamped inverter provided in this embodiment further includes: a first capacitor C1, a second capacitor C2, a first diode D1, and a second diode D2.

A first end of the first capacitor C1 is connected to the positive direct current bus BUS+. A second end of the first capacitor C1 is connected to a first end of the second capacitor C2. A second end of the second capacitor C2 is connected to the negative direct current bus BUS−.

A cathode of the first diode D1 is connected to the second end of the first switching transistor T1. An anode of the first diode D1 is connected to the second end of the first capacitor C1. A cathode of the second diode D2 is connected to the anode of the first diode D1. An anode of the second diode D2 is connected to the second end of the third switching transistor T3.

Instead of controlling two of four switching transistors to perform complementary operations at high frequency in each half cycle, the three-level NPC inverter provided in this embodiment compares the average value of the output current with a preset threshold, and controls, based on a comparison result, the switching transistors to operate. When the average value of the output current is in a preset interval, the three-level NPC inverter controls two switching transistors to perform high-frequency operations. When the average value of the output current is outside the preset interval, the three-level NPC inverter controls only one switching transistor to perform a high-frequency operation. The preset interval is an interval near 0, that is, a preset interval formed by the second current threshold less than 0 and the first current threshold greater than 0. The embodiment may greatly reduce time of the high-frequency operation of the switching transistor. Therefore, power consumption caused by the high-frequency operation of the switching transistor in the inverter may be reduced, and electric energy conversion efficiency of the inverter may be improved.

Based on the three-level NPC inverter provided in the foregoing embodiment, an embodiment may further provide a control method for an inverter. The following provides a detailed description with reference to the accompanying drawings.

FIG. 14 is a flowchart of a control method for an inverter according to an embodiment.

The control method for an inverter provided in this embodiment is applied to the three-level neutral point clamped inverter described in the foregoing embodiment. For details, refer to the three-level neutral point clamped inverter shown in FIG. 13. The three-level neutral point clamped inverter includes at least the following four switching transistors: a first switching transistor T1, a second switching transistor T2, a third switching transistor T3, and a fourth switching transistor T4. A first end of the first switching transistor T1 is connected to a positive direct current bus BUS+. A second end of the first switching transistor T1 is connected to a first end of the second switching transistor T2. A second end of the second switching transistor T2 is connected to a first end of the third switching transistor T3. A second end of the third switching transistor T3 is connected to a first end of the fourth switching transistor T4. A second end of the fourth switching transistor T4 is connected to a negative direct current bus BUS−. The second end of the second switching transistor T2 is an output end of the three-level neutral point clamped inverter, such as Vout.

The method includes the following steps.

S1401: Obtain an average value of an output current of the three-level neutral point clamped inverter. The average value of the output current may be an average value of the output current of the three-level neutral point clamped inverter in a switching cycle.

The output current of the inverter is actually superimposed by one ripple current. Therefore, to more accurately control an operation of the switching transistor based on the output current, an average value of the output current in one switching cycle may be collected. Output currents of several sampling points may be collected in one switching cycle, and then an average value of the output currents of the sampling points is obtained.

S1402: When the average value of the output current of the three-level neutral point clamped inverter is greater than a first current threshold or less than a second current threshold, control only one of the four switching transistors to perform a high-frequency operation, to reduce power consumption caused by a high-frequency operation. The output current of the inverter is positive when flowing out of the inverter and is negative when flowing into the inverter. The first current threshold is a positive number, and the second current threshold is a negative number.

According to the control method for a three-level NPC inverter provided in this embodiment, the average value of the output current of the inverter is obtained in real time, the average value of the output current is compared with a preset threshold, and the switching transistor is controlled, based on a comparison result, to operate. When the average value of the output current is in a preset interval, two switching transistors are controlled to perform high-frequency operations. When the average value of the output current is outside the preset interval, only one switching transistor is controlled to perform a high-frequency operation. The preset interval is an interval near 0, that is, a preset interval formed by the second current threshold less than 0 and the first current threshold greater than 0. The control method is different from a conventional method in which two of four switching transistors are controlled to perform complementary operations at high frequency in each half cycle. The embodiment may greatly reduce time of the high-frequency operation of the switching transistor. Therefore, power consumption caused by the high-frequency operation of the switching transistor in the inverter may be reduced, and electric energy conversion efficiency of the inverter may be improved.

The controlling only one of the four switching transistors to perform a high-frequency operation when the average value of the output current of the three-level neutral point clamped inverter is greater than a first current threshold or less than a second current threshold further includes:
  in a positive half cycle of an output voltage of the three-level neutral point clamped inverter, controlling the second switch unit to be turned on, and controlling the fourth switch unit to be turned off; if the average value of the output current is greater than the first current threshold, controlling the third switch unit to be turned off, and controlling the first switch unit to perform a high-frequency operation; and if the average value of the output current is less than the second current threshold, controlling the first switch unit to be turned off, and controlling the third switch unit to perform a high-frequency operation; and
  in a negative half cycle of the output voltage, controlling the third switch unit to be turned on, controlling the first switch unit to be turned off; if the average value of the output current is greater than the first current threshold, controlling the fourth switch unit to be turned off, and controlling the second switch unit to perform a high-frequency operation; and if the average value of the output current is less than the second current threshold, controlling the second switch unit to be turned off, and controlling the fourth switch unit to perform a high-frequency operation.

An absolute value of the first current threshold may be equal to or not equal to an absolute value of the second current threshold. This is not limited in this embodiment.

In addition, to improve quality of the output current, the first current threshold may be adjusted based on any one of the following parameters: a total harmonic current distortion of the output current, a modulation ratio of the three-level neutral point clamped inverter, a power factor of the inverter, or an output power of the three-level neutral point clamped inverter.

The second current threshold is adjusted based on any one of the following parameters: the total harmonic current distortion of the output current, the modulation ratio of the three-level neutral point clamped inverter, the power factor of the inverter, or the output power of the three-level neutral point clamped inverter.

For a manner in which the first current threshold and the second current threshold are adjusted based on any one of the foregoing parameters, refer to the description of the foregoing photovoltaic system embodiment.

It should be understood that "at least one (item)" means one or more and "a plurality of" means two or more. The term "and/or" is used for describing an association relationship between associated objects and represents that three relationships may exist. For example, "A and/or B" may represent the following three cases: only A exists, only B exists, and both A and B exist, where A and B may be singular or plural. The character "/" may indicate an "or" relationship between the associated objects. "At least one of the following items (pieces)" or a similar expression thereof means any combination of these items, including any combination of singular items (pieces) or plural items (pieces). For example, at least one of a, b, or c may indicate a, b, c, a and b, a and c, b and c, or a, b, and c, where a, b, and c may be singular or plural.

The foregoing embodiments are only intended for describing the embodiments. Although described in detail with reference to the foregoing embodiments, persons of ordinary skill in the art should understand that they may still make modifications without departing from the scope of the solutions of the embodiments.

The invention claimed is:

1. A photovoltaic system, comprising:
   a three-level neutral point clamped inverter, comprising a first switch unit, a second switch unit, a third switch unit, and a fourth switch unit; and
   a controller,
   wherein a first end of the first switch unit is connected to a positive direct current bus, a second end of the first switch unit is connected to a first end of the second switch unit, a second end of the second switch unit is connected to a first end of the third switch unit, a second end of the third switch unit is connected to a first end of the fourth switch unit, a second end of the fourth switch unit is connected to a negative direct current bus, and the second end of the second switch unit is an output end of the three-level neutral point clamped inverter; and
   the controller is configured to:
   in response to an average value of an output current of the three-level neutral point clamped inverter is greater than a first current threshold or less than a second current threshold, control only one of the four switch units to perform a high-frequency operation, to reduce power consumption caused by a high-frequency operation, wherein the average value of the output current is an average value of the output current of the three-level neutral point clamped inverter in a switching cycle, the output current of the inverter is positive in response to flowing out of the inverter, and is negative in response to flowing into the inverter, the first current threshold is a positive number, and the second current threshold is a negative number.

2. The photovoltaic system according to claim 1, wherein the controller is further configured to:
   in response to the average value of the output current is greater than the second current threshold and less than the first current threshold, control two of the four switch units to perform high-frequency operations.

3. The photovoltaic system according to claim 1, wherein in a positive half cycle of an output voltage of the three-level neutral point clamped inverter, the controller is further configured to: control the second switch unit to be turned on, and control the fourth switch unit to be turned off; in response to the average value of the output current is greater than the first current threshold, control the third switch unit to be turned off, and control the first switch unit to perform a high-frequency operation; and in response to the average value of the output current is less than the second current threshold, control the first switch unit to be turned off, and control the third switch unit to perform a high-frequency operation; and
   in a negative half cycle of the output voltage, the controller is further configured to: control the third switch unit to be turned on, and control the first switch unit to be turned off; in response to the average value of the output current is greater than the first current threshold, control the fourth switch unit to be turned off, and control the second switch unit to perform a high-frequency operation; and in response to the average value of the output current is less than the second current threshold, control the second switch unit to be turned off, and control the fourth switch unit to perform a high-frequency operation.

4. The photovoltaic system according to claim 1, wherein in response to a minimum value of the output current in one switching cycle is 0, the first current threshold is greater than or equal to an average value of the output current corresponding to the switching cycle; and
   in response to a maximum value of the output current in one switching cycle is 0, the second current threshold is less than or equal to an average value of the output current corresponding to the switching cycle.

5. The photovoltaic system according to claim 1, wherein the controller is further configured to:
   obtain a total harmonic current distortion of the output current; and in response to the total harmonic current distortion increases, increase the first current threshold; or
   in response to the total harmonic current distortion decreases, decrease the first current threshold.

6. The photovoltaic system according to claim 1, wherein the controller is further configured to:
   obtain a modulation ratio of the three-level neutral point clamped inverter; and in response to the modulation ratio decreases, increase the first current threshold; or
   in response to the modulation ratio increases, decrease the first current threshold, wherein the modulation ratio is a ratio of an output phase voltage peak of the three-level neutral point clamped inverter to a half direct current bus voltage.

7. The photovoltaic system according to claim 1, wherein the controller is further configured to:
obtain a power factor of the three-level neutral point clamped inverter; and in response to an absolute value of the power factor decreases, increase the first current threshold; or
in response to an absolute value of the power factor increases, decrease the first current threshold.

8. The photovoltaic system according to claim 1, wherein the controller is further configured to:
obtain an output power of the three-level neutral point clamped inverter; and in response to the output power decreases, increase the first current threshold; or
in response to the output power increases, decrease the first current threshold.

9. The photovoltaic system according to claim 1, wherein the controller is further configured to:
obtain the total harmonic current distortion of the output current; and in response to the total harmonic current distortion increases, decrease the second current threshold; or
in response to the total harmonic current distortion decreases, increase the second current threshold.

10. The photovoltaic system according to claim 1, wherein the controller is further configured to:
obtain the modulation ratio of the three-level neutral point clamped inverter; and in response to the modulation ratio decreases, decrease the second current threshold; or
in response to the modulation ratio increases, increase the second current threshold, wherein the modulation ratio is the ratio of the output phase voltage peak of the three-level neutral point clamped inverter to the half direct current bus voltage.

11. The photovoltaic system according to claim 1, wherein the controller is further configured to:
obtain the power factor of the three-level neutral point clamped inverter; and in response to the absolute value of the power factor decreases, decrease the second current threshold; or
in response to the absolute value of the power factor increases, increase the second current threshold.

12. The photovoltaic system according to claim 1, wherein the controller is further configured to:
obtain the output power of the three-level neutral point clamped inverter; and in response to the output power decreases, decrease the second current threshold; or
in response to the output power increases, increase the second current threshold.

13. The photovoltaic system according to claim 1, wherein the three-level neutral point clamped inverter is a central inverter, a string inverter, or a household single-phase inverter.

14. The photovoltaic system according to claim 1, wherein the three-level neutral point clamped inverter further comprises: a first capacitor, a second capacitor, a first diode, and a second diode;
a first end of the first capacitor is connected to the positive direct current bus, a second end of the first capacitor is connected to a first end of the second capacitor, and a second end of the second capacitor is connected to the negative direct current bus; and
a cathode of the first diode is connected to the second end of the first switch unit, an anode of the first diode is connected to the second end of the first capacitor, a cathode of the second diode is connected to the anode of the first diode, and an anode of the second diode is connected to the second end of the third switch unit.

15. An inverter, comprising:
a first switch unit;
a second switch unit;
a third switch unit; and
a fourth switch unit, wherein a first end of the first switch unit is connected to a positive direct current bus, a second end of the first switch unit is connected to a first end of the second switch unit, a second end of the second switch unit is connected to a first end of the third switch unit, a second end of the third switch unit is connected to a first end of the fourth switch unit, a second end of the fourth switch unit is connected to a negative direct current bus, and the second end of the second switch unit is an output end of the three-level neutral point clamped inverter; and further comprising:
an inverter controller, configured to:
in response to an average value of an output current of the three-level neutral point clamped inverter is greater than a first current threshold or less than a second current threshold, control only one of the four switch units to perform a high-frequency operation, to reduce power consumption caused by a high-frequency operation, wherein the average value of the output current is an average value of the output current of the three-level neutral point clamped inverter in a switching cycle, the output current of the inverter is positive in response to flowing out of the inverter, and is negative in response to flowing into the inverter, the first current threshold is a positive number, and the second current threshold is a negative number.

16. The inverter according to claim 15, wherein
in a positive half cycle of an output voltage of the three-level neutral point clamped inverter, the inverter controller is further configured to: control the second switch unit to be turned on, and control the fourth switch unit to be turned off; in response to the average value of the output current is greater than the first current threshold, control the third switch unit to be turned off, and control the first switch unit to perform a high-frequency operation; and in response to the average value of the output current is less than the second current threshold, control the first switch unit to be turned off, and control the third switch unit to perform a high-frequency operation; and
in a negative half cycle of the output voltage, the inverter controller is further configured to: control the third switch unit to be turned on, and control the first switch unit to be turned off; in response to the average value of the output current is greater than the first current threshold, control the fourth switch unit to be turned off, and control the second switch unit to perform a high-frequency operation; and in response to the average value of the output current is less than the second current threshold, control the second switch unit to be turned off, and control the fourth switch unit to perform a high-frequency operation.

17. The inverter according to claim 15, wherein the inverter controller is further configured to adjust the first current threshold based on at least one of a total harmonic current distortion of the output current, a modulation ratio of the three-level neutral point clamped inverter, a power factor of the inverter, and an output power of the three-level neutral point clamped inverter.

18. The inverter according to claim 15, wherein the inverter controller is further configured to adjust the second current threshold based on at least one of the total harmonic current distortion of the output current, the modulation ratio of the three-level neutral point clamped inverter, the power factor of the inverter, and the output power of the three-level neutral point clamped inverter.

19. The inverter according to claim 15, further comprising:
- a first capacitor;
- a second capacitor;
- a first diode; and
- a second diode, wherein a first end of the first capacitor is connected to the positive direct current bus, a second end of the first capacitor is connected to a first end of the second capacitor, and a second end of the second capacitor is connected to the negative direct current bus; and
- a cathode of the first diode is connected to the second end of the first switch unit, an anode of the first diode is connected to the second end of the first capacitor, a cathode of the second diode is connected to the anode of the first diode, and an anode of the second diode is connected to the second end of the third switch unit.

20. A control method for an inverter, applied to a three-level neutral point clamped inverter, wherein the three-level neutral point clamped inverter comprises a first switch unit, a second switch unit, a third switch unit, and a fourth switch unit; a first end of the first switch unit is connected to a positive direct current bus, a second end of the first switch unit is connected to a first end of the second switch unit, a second end of the second switch unit is connected to a first end of the third switch unit, a second end of the third switch unit is connected to a first end of the fourth switch unit, a second end of the fourth switch unit is connected to a negative direct current bus, and the second end of the second switch unit is an output end of the three-level neutral point clamped inverter; and the method comprises:
- obtaining an average value of an output current of the three-level neutral point clamped inverter, wherein the average value of the output current is an average value of the output current of the three-level neutral point clamped inverter in a switching cycle; and
- in response to the average value of the output current of the three-level neutral point clamped inverter is greater than a first current threshold or less than a second current threshold, controlling only one of the four switch units to perform a high-frequency operation, to reduce power consumption caused by a high-frequency operation, wherein the output current of the inverter is positive in response to flowing out of the inverter, and is negative in response to flowing into the inverter, the first current threshold is a positive number, and the second current threshold is a negative number.

* * * * *